(12) United States Patent
Asaoka

(10) Patent No.: US 9,822,972 B2
(45) Date of Patent: Nov. 21, 2017

(54) CREMATION SYSTEM

(71) Applicant: TOKYO HAKUZEN CO., LTD., Chiyoda-ku, Tokyo (JP)

(72) Inventor: Machiko Asaoka, Tokyo (JP)

(73) Assignee: TOKYO HAKUZEN CO., LTD., Tokyo (JP)

( * ) Notice: Subject to any disclaimer, the term of this patent is extended or adjusted under 35 U.S.C. 154(b) by 331 days.

(21) Appl. No.: 14/648,508

(22) PCT Filed: Nov. 25, 2013

(86) PCT No.: PCT/JP2013/081618
§ 371 (c)(1),
(2) Date: May 29, 2015

(87) PCT Pub. No.: WO2014/087864
PCT Pub. Date: Jun. 12, 2014

(65) Prior Publication Data
US 2015/0308678 A1    Oct. 29, 2015

(30) Foreign Application Priority Data

Dec. 3, 2012  (JP) ................................. 2012-263922

(51) Int. Cl.
*F23G 1/00*     (2006.01)
*F23G 5/46*     (2006.01)
(Continued)

(52) U.S. Cl.
CPC ............... *F23G 1/00* (2013.01); *F01K 3/004* (2013.01); *F01K 25/08* (2013.01); *F22B 1/18* (2013.01);
(Continued)

(58) Field of Classification Search
CPC ...... F23G 1/00; F23G 5/46; F23G 5/00; F23G 5/50; F23G 2207/50; F23G 2900/55008;
(Continued)

(56) References Cited

U.S. PATENT DOCUMENTS 1,800,959 A  *  4/1931  Ruths ..................... F01K 3/004
                                                     122/35
5,078,065 A  *  1/1992  Tsunemi ................. F23C 10/24
                                                     110/165 A
(Continued)

FOREIGN PATENT DOCUMENTS

JP    S52-006853 A    1/1977
JP    H10-184316 A    7/1998
(Continued)

OTHER PUBLICATIONS

PCT, "International Search Report for PCT/JP2013/081618," dated Jan. 7, 2014.

*Primary Examiner* — Kenneth Rinehart
*Assistant Examiner* — Raymond Williamson
(74) *Attorney, Agent, or Firm* — Manabu Kanesaka

(57) ABSTRACT

A cremation system has an exhaust gas/warm water heat exchanger which exchanges the heat of exhaust gas from a re-combustion furnace with the heat of a medium, and a buffer tank and flow rate regulating valves for suppressing temperature changes of the medium. A medium turbine is driven by an evaporator which generates working medium steam by heating and evaporating a low-boiling working medium with the heat of the medium, and power is generated by a power generator. A buffer tank is further provided to suppress temperature changes of the medium flowing from the evaporator into the exhaust gas/warm water heat exchanger. A power control device supplies the generated power to devices constituting the cremation system, while (Continued)

covering any shortfall in power required by the devices with power from an external power source.

10 Claims, 14 Drawing Sheets

(51) Int. Cl.
    *F23G 5/50*         (2006.01)
    *F01K 3/00*         (2006.01)
    *F01K 25/08*       (2006.01)
    *F22B 1/18*        (2006.01)

(52) U.S. Cl.
    CPC ............... *F23G 5/46* (2013.01); *F23G 5/50* (2013.01); *F23G 2206/203* (2013.01); *F23G 2207/50* (2013.01); *F23G 2900/55008* (2013.01); *Y02E 20/12* (2013.01)

(58) Field of Classification Search
    CPC ........... F23G 2900/50001; F01K 3/004; F01K 25/08; F22B 1/18; Y02E 20/12
    USPC ...... 110/194, 208, 254, 295; 122/452, 451 R
    See application file for complete search history.

(56) References Cited

U.S. PATENT DOCUMENTS

| | | | |
|---|---|---|---|
| 6,436,337 B1* | 8/2002 | Gross | C22B 9/16 266/200 |
| 2004/0055303 A1* | 3/2004 | Sugarmen | F01K 3/247 60/670 |
| 2010/0139533 A1 | 6/2010 | Park et al. | |
| 2014/0075944 A1* | 3/2014 | Tavares | F23G 5/16 60/651 |

FOREIGN PATENT DOCUMENTS

| | | |
|---|---|---|
| JP | 2002-60759 A | 2/2002 |
| JP | 2009-221961 A | 10/2009 |
| JP | 2010-133693 A | 6/2010 |
| JP | 2012-013266 A | 1/2012 |
| JP | 4875546 B2 | 2/2012 |
| JP | 2013-124568 A | 6/2013 |

* cited by examiner

CREMATION SYSTEM

RELATED APPLICATIONS

The present application is National Phase of International Application No. PCT/JP2013/081618 filed Nov. 25, 2013, and claims priority from Japanese Application No. 2012-263922, filed Dec. 3, 2012.

TECHNICAL FIELD

The present invention relates to a cremation system, and more particularly to a cremation system equipped with a power generation system.

BACKGROUND ART

In conventional cremation systems, high-temperature exhaust gas generated in a cremation furnace is first cooled by a cooler etc., then it undergoes a dust removal process in a dust collector, followed by the removal of dioxin and the like in a catalytic device, before finally being released through a stack to the atmosphere. That is, it is a common practice in conventional cremation systems to simply throw away the high-temperature thermal energy without reusing it.

In recent years, however, there has been a demand for development of a cremation system which can save energy by increasing the energy efficiency of the cremation system as a whole while respecting the dignity of a person (body).

As a first conventional technology for saving energy, a power generation system and a cremation furnace described in Patent Literature 1 (Japanese Patent Laid-Open No. 2012-13266) are cited. This literature describes how to effectively utilize the thermal energy generated in the cremation furnace by integrating the power generation system in a cremation system, using the high-temperature thermal energy generated in the cremation furnace to generate steam by means of a heat exchanger, and using this steam to drive a steam turbine and generate power.

Next, the first conventional technology will be described in detail with reference to FIG. 10. In FIG. 10, a cremation furnace 101 includes a boiler function. Water supplied by a feed water pump 106 is gasified by the high-temperature heat inside the cremation furnace 101, and water vapor is sent to a steam separator 102. After water droplets are removed from the water vapor by the steam separator 102, steam is sent to a power generator 103 and drives a steam turbine to generate power. The low-pressure steam after serving to drive the steam turbine is sent to a steam condenser 104, to which cooling water is supplied from a cooling tower 105, and is condensed into water and sent to a hot well tank 107 to be circulated to the cremation furnace 101. Thus, the cremation furnace described in this publication enhances the thermal efficiency by turning the incineration furnace into a boiler.

As a second conventional technology concerned with a cremation facility integral with a power generation device, a mobile integral cremation facility described in Patent Literature 2 (Japanese Patent Laid-Open No. 2010-133693) will be described with reference to FIG. 11. In this publication, an electricity supply device 115 supplies power for operating an incineration furnace 111, cooling devices 112a, 112b, dust collectors 113a, 113b, and an exhaust heat discharge device 114. Thus, there is no need for receiving power from the outside, which is why the mobile integral cremation facility can be realized.

As a third conventional technology for power generation through effective utilization of low-temperature, low-volume exhaust heat, an exhaust heat power generation device and a method for controlling the degree of superheat of working medium steam in an exhaust heat power generation device, described in Patent Literature 3 (Japanese Patent No. 4875546), will be described with reference to FIG. 12.

FIG. 12 is a configurational view of the exhaust heat power generation device described in this publication. Warm water from an exhaust heat source 129 is supplied to a steam generator 121 to heat a working medium liquid and generate working medium steam. Then, this working medium steam is supplied to a liquid drop separator 122. The pressure and the temperature of this working medium steam are measured with a pressure sensor 126 and a temperature sensor 127, respectively, and the measurement information is transmitted to a control panel 128. The working medium steam, of which the pressure and the temperature are controlled by the control panel 128, rotates a turbine 123 and drives a high-speed power generator, which is coupled to the turbine, to generate power.

The working medium steam from the turbine 123 is cooled into a liquid in a condenser 124, and is sent to the steam generator 121 through a liquid feed pump 125, so that working medium steam is generated again. Thus, the working medium with a low boiling point (about 40° C.) is circulated. This exhaust heat power generation device calculates the degree of superheat with reference to the pressure and the temperature measured by the pressure sensor 126 and the temperature sensor 127, and controls the flow rate of the working medium liquid by increasing or reducing the rotation speed of the liquid feed pump 125 such that the calculated value matches a preset degree of superheat. As the degree of superheat is kept constant through this manner of control, the exhaust heat is recovered efficiently for power generation.

As a fourth conventional technology for obtaining stable power output regardless of changes in exhaust heat flow rate or exhaust heat temperature, a power generation control device utilizing waste heat described in Patent Literature 4 (Japanese Patent Laid-Open No. H10-184316) will be described with reference to FIG. 13.

FIG. 13 is a block diagram of a power generation plant described in this publication. The power generation plant has a steam flow rate control system for controlling the flow rate of steam flowing into a steam turbine 131, a steam pressure control system for controlling the inlet pressure of the steam turbine, and a hot water level control system for controlling the hot water level in each of steam separators 132a to 132c. The power generation plant further includes a hot water temperature control system for controlling the temperature of excess hot water in each of the high-pressure, intermediate-pressure, and low-pressure steam separators 132a to 132c, a steam condenser level control system for controlling the water level in a steam condenser 133, a makeup water volume control system for controlling the volume of makeup water which is supplied to a cooling tower 134 such that the water level in the cooling tower 134 reaches a set value, and an internal temperature control system for controlling the cooling water temperature in the cooling tower 134. Using these control systems, the power generation plant generates power with high efficiency by stabilizing power load fluctuations, fluctuations in flow rate of steam flowing into the steam turbine, fluctuations in flow rate and pressure of exhaust heat steam, fluctuations in internal temperature of the steam condenser, fluctuations in cooling water volume, fluctuations in outlet temperature of an exhaust heat exchanger, level fluctuations in the cooling tower, etc.

As a fifth conventional technology which improves the efficiency of utilization of heat source energy by means of binary power generation, a binary power generation system described in Patent Literature 5 (Japanese Patent Laid-Open No. 2009-221961) will be described with reference to FIG. 14.

FIG. 14 is a block diagram of the binary power generation system described in this publication. The power generation system generates power by introducing steam of a low-boiling working medium 149, which has evaporated through heat exchange with a heat source fluid 141, into a steam turbine 144. A closed loop is formed by arranging a preheater 143 which preheats a working medium, evaporators 142A, 142B, the steam turbine 144, a heat recovery unit 148, a condenser 146, and medium transfer pumps 147A, 147B in series. In the binary power generation system of this publication, the plurality of stages of evaporators 142A, 142B, which are different from each other in steam temperature and pressure of the working medium, are provided, and the steam generated in these stages is respectively sent to the high-pressure stage and the low-pressure stage of the steam turbine (mixed-pressure turbine) 144 to drive a turbine power generator 145. This configuration enhances the efficiency of utilization of the thermal energy possessed by the heat source fluid, compared with the method of driving a steam turbine with the steam of a working medium generated from a single-stage evaporator.

CITATION LIST

Patent Literature

Patent Literature 1: Japanese Patent Laid-Open No. 2012-13266
Patent Literature 2: Japanese Patent Laid-Open No. 2010-133693
Patent Literature 3: Japanese Patent No. 4875546
Patent Literature 4: Japanese Patent Laid-Open No. H10-184316
Patent Literature 5: Japanese Patent Laid-Open No. 2009-221961

SUMMARY OF INVENTION

Technical Problem

Since the first conventional technology described in Patent Literature 1 turns the cremation furnace into a boiler by installing a panel-shaped heat exchanger inside the cremation furnace, there is a reliability problem in that the heat exchanger is exposed to high temperatures. Moreover, the power generation system described in this publication requires maintenance, repair, replacement with a new one of the heat exchanger at certain intervals.

One of the problems peculiar to integration of a power generation system into a cremation system is that the temperature inside the cremation furnace fluctuates significantly during an operation cycle of the cremation furnace, namely, fluctuates among the processes of rapid heating, incineration, and cooling. During night-time, when generally no cremation takes place, the inside of the cremation furnace is at a low temperature. When the temperature of the cremation furnace falls below a predetermined temperature, no power can be generated by the method of driving a steam turbine with high-temperature steam.

Thus, on one hand, the output power from the power generator is not stabilized as the thermal energy for driving the steam turbine fluctuates significantly, and on the other hand, the operation conditions of the power generation system are extremely unstable due to the necessity of stopping the power generation system during night-time, both of which cause the devices constituting the power generation system to deteriorate easily.

According to the second conventional technology described in Patent Literature 2, the mobile integral cremation facility is provided with the electricity supply device 115 to supply power for operating the devices including the incineration furnace 111, but this publication does not describe how to generate power. Gathering from FIG. 11, the electricity supply device 115 seems to be an engine-type power generator using liquid fuel. In other words, this publication does not disclose nor suggest the technological concept of how to reuse the thermal energy of the exhaust gas discharged from the cremation furnace in order to improve the energy efficiency of the cremation system as a whole.

According to the third conventional technology described in Patent Literature 3, heat is exchanged between a low-boiling working medium with a boiling point of about 40° C. and warm water of approximately 30° C. to 80° C. to generate working medium steam, and this working medium steam is supplied to the turbine 123 to generate power. According to this conventional technology, in order to prevent the control from becoming unstable as the warm water temperature and the medium temperature are not stabilized yet immediately after circulation of the working medium, the target value of the degree of superheat is set to be lower than the original target value, until a certain period of time has elapsed from the start of circulation of the working medium, so as to control increases and decreases in flow rate of the working medium liquid.

However, what the exhaust heat power generation device according to the third conventional technology assumes as an exhaust heat source is a relatively stable exhaust heat source such as plant exhaust heat, hot spring water (geothermal heat), or sunlight, and not such an exhaust heat source as the exhaust gas discharged from a cremation furnace of which the heat quantity changes widely over a short time. Therefore, the feedback control using the degree of superheat as a guide, which is the main feature of this conventional technology, is effective as long as the heat quantity of the exhaust heat source is stable and the power generated in the power generator and the overall power consumption of the devices consuming this power are balanced; however, when the cremation system is operated with the exhaust heat power generation device of this publication integrated in the cremation system, due to the large fluctuation in heat quantity of the exhaust heat source, the control focusing on the degree of superheat does not allow stable operation of the entire cremation system.

To describe this more specifically, the object to be combusted, the heat quantity generated, the flow rate of exhaust gas, the temperature of the cremation furnace, etc. fluctuate widely during an initial stage (to about 10th minute), an intermediate stage (from about 10th minute to about 25th minute), and a later stage (from about 25th minute onward) of cremation. When a power generation system is integrated in a cremation system, it is essential to take these factors into consideration in the design of the cremation system. Patent Literature 3 does not mention these factors or a control method dealing with them, and when the exhaust heat power generation device according to the third conventional technology is integrated in the cremation system, it is impossible to operate the cremation system stably using the power from the exhaust heat power generation device.

According to the fourth conventional technology described in Patent Literature 4, even when the flow rate of the exhaust heat or the temperature of the exhaust heat from an industrial plant etc. changes, stable output of the power generator is always obtained by making full use of the various control systems such as the steam flow rate control system, the steam pressure control system, and the hot water level control system. However, as the working medium is water, when the exhaust gas temperature falls to a low temperature, power generation is practically no longer possible, which makes this technology unsuitable to a power generation system used in a cremation system.

Although the various control systems according to the fourth conventional technology are effective as long as the flow rate of the exhaust heat or the temperature of the exhaust heat from an industrial plant etc. is stable over a relatively long time, since the exhaust heat flow rate or the exhaust heat temperature fluctuates widely over a short time in the cremation system as described above, the various control systems according to the fourth conventional technology do not function effectively, which makes it impossible to operate the cremation system stably using the power from the power generator.

The binary power generation system described in Patent Literature 5 is a binary power generation system which vaporizes a low-boiling working medium (hydrocarbon, ammonia, etc.) and drives a steam turbine to generate power. While power is generated through heat exchange from a low-temperature heat source, which is the feature of the binary power generation, power is generated efficiently by means of the mixed-pressure turbine. However, since a relatively stable geothermal fluid (hot water or steam) or warm exhaust water from a plant facility is assumed as the heat source, when the binary power generation system according to this conventional technology is integrated into a system such as a cremation system, where the exhaust heat flow rate or the exhaust heat temperature fluctuates widely over a short time, the system functions as long as the fluctuation is small, but if the fluctuation becomes larger, it is no longer possible to operate the cremation system stably through the control of the mixed-pressure turbine alone.

Solution to Problem

The present invention provides a cremation system which favorably solves the above-described problems.

A cremation system of the present invention includes: an incineration furnace for combusting a body; an exhaust gas/medium heat exchanger into which exhaust gas from the incineration furnace flows and which exchanges the heat of the exhaust gas with the heat of a medium; a first buffer tank into which the medium is injected and which controls temperature fluctuations of the medium; an evaporator which generates working medium steam by heating and evaporating a low-boiling working medium with the heat of the medium from the first buffer tank; a medium turbine which is driven by the working medium steam; a power generator which is driven by the medium turbine and generates power; and a power control device which supplies power generated in the power generator to devices constituting the cremation system while covering any shortfall in power required by the devices with power from an external power source.

The cremation system may be further provided with a second buffer tank into which the medium flowing out of the evaporator is injected and which suppresses temperature fluctuations of the medium and supplies the medium to the exhaust gas/medium heat exchanger.

The cremation system may be configured such that, when the temperatures of the medium inside the first buffer tank and the second buffer tank exceed respective set temperatures, a cooling medium for cooling the medium inside the buffer tanks is injected into the first buffer tank and the second buffer tank.

The cremation system may further have cooling medium injection means, which injects the cooling medium for cooling the medium, in a medium passage which is provided between the first buffer tank and the evaporator and through which the medium flows, and the cooling medium injection means may be controlled such that the temperature of the medium flowing into the evaporator is within a set temperature range.

The cremation system may further include: a first flow rate regulating valve which is provided between the first buffer tank and the evaporator; a bypass passage through which the medium is returned from between the first buffer tank and the evaporator to the exhaust gas/medium heat exchanger; and a second flow rate regulating valve which is provided in the bypass passage, and the first flow rate regulating valve and the second flow rate regulating valve may be controlled such that the temperature of the medium flowing out of the evaporator is within a set temperature range.

The cremation system may further include: a first medium circulation pump which suctions the medium flowing out of the first buffer tank and sends the medium to the evaporator; a second medium circulation pump which suctions the medium flowing out of the second buffer tank and sends the medium to the exhaust gas/medium heat exchanger; and a first level meter and a second level meter which measure a first liquid level and a second liquid level of the medium inside the first buffer tank and the second buffer tank, respectively, and the first medium circulation pump and the second medium circulation pump may control the flow velocity of the medium such that the difference between the first liquid level and the second liquid level is a constant value.

The cremation system may be configured such that, when it is determined that the first liquid level and the second liquid level reach their respective set values with reference to signals from the first level meter and the second level meter, discharge valves provided in the first buffer tank and the second buffer tank are opened to discharge the medium inside the first buffer tank and the second buffer tank.

The cremation system may be further provided with a power information processing device which calculates information from various sensors provided in the cremation system and generates a control signal, and controls at least one device of the devices constituting the cremation system through the control signal.

In the cremation system, a plurality of cremation furnaces may be provided in parallel, and exhaust gas from the cremation furnaces may flow into a common exhaust gas/medium heat exchanger.

The cremation system may further include a hot air recovery heat exchanger which exchanges the heat of the exhaust gas discharged from the exhaust gas/medium heat exchanger with the heat of air to generate hot air, and a hot air recovery passage through which the hot air is sent to the cremation furnace.

The cremation system may be configured so as to control, with reference to information on a combustion stage of the cremation furnace, at least one of the exhaust gas/medium heat exchanger, the evaporator, the medium turbine, the power generator, the cooling medium injection means, the first flow rate regulating valve, the second flow rate regulating valve, the first medium circulation pump, the second medium circulation pump, and the means for injecting the cooling medium into the first buffer tank and the second buffer tank.

The cremation system may be further provided with a backup power source in case of failure of the external power source, and when power from the external power source stops or decreases, the external power source may be switched to the backup power source.

Advantageous Effects of Invention

The cremation system of the present invention employs the binary power generation method of converting the thermal energy of exhaust gas from the cremation furnace into the thermal energy of warm water by passing the exhaust gas through the heat exchanger, vaporizing a low-boiling working medium by passing this warm water through the evaporator via the buffer tank, and driving the steam turbine with the generated working medium steam to generate power. Then, the generated power is supplied to the devices constituting the cremation system, so that the power consumption of the cremation system can be reduced significantly.

The exhaust gas discharged from the cremation furnace is characterized in that its heat quantity changes widely over a short time. The cremation system according to the present invention allows stable operation of the cremation system by generating power stably while covering any shortfall in power required by the cremation system with power from the external power source or the backup power source.

Since it is possible to predict the information such as the flow rate, the temperature, and the rate of temperature rise of the exhaust heat from the cremation furnace, it is possible to use this predictive information to control the power generation system efficiently and stably.

Since the power generation system of the present invention employs the binary power generation system of vaporizing a low-boiling medium and driving a medium turbine, power generation is possible even when the temperature of exhaust gas discharged from the cremation furnace falls, and the power generation time per day can be prolonged. Accordingly, the power generation efficiency can be enhanced.

Since the heat quantity of the warm water flowing into the evaporator is controlled such that the temperature of the warm water from the exhaust gas/warm water heat exchanger does not exceed a set value, the safety of the evaporator is secured, and the binary power generation can be operated stably even when there are severe fluctuations of the warm water which are a problem peculiar to the cremation system.

The cremation system controls such that, when the temperature of the warm water from the exhaust gas/warm water heat exchanger reaches a designated specified value, the cooling water is injected from a water injection device to the warm water flowing into the evaporator so as to lower the temperature of the warm water. Therefore, even when the exhaust gas reaches an abnormally high temperature due to abnormal combustion in the cremation furnace etc., the binary power generation system is unlikely to come to an emergency stop, and the binary power generation can be operated stably even when there are severe fluctuations of the warm water.

Since the high-temperature warm water from the exhaust gas/warm water heat exchanger flows temporarily into the first buffer tank, and this warm water is supplied to the evaporator after its temperature is averaged with the temperature of the warm water inside the first buffer tank, power can be generated stably even when the amount of exhaust heat of the exhaust gas changes significantly.

Since the warm water from the evaporator flows into the second buffer tank, separately from the first buffer tank, and this warm water is returned to the exhaust gas/warm water heat exchanger after its temperature is averaged with the temperature of the warm water inside the second buffer tank, it is unlikely that the temperature of the warm water inside the exhaust gas/warm water heat exchanger rises excessively. Thus, the exhaust gas/warm water heat exchanger is highly reliable and temperature fluctuations of the warm water from the exhaust gas/warm water heat exchanger are reduced, so that the cremation system can be operated stably to generate power with higher efficiency.

The water injection valves are automatically controlled by the power information processing device such that, when the warm water temperatures at the thermometers provided in the two buffer tanks reach an upper set value, the cooling water is injected from the water injection device through the water injection valves into the two buffer tanks so that the temperatures of the warm water inside the buffer tanks are equal to or lower than the upper set value.

The first and second buffer tanks are each provided with the level meter for measuring the liquid level of the warm water, and signals from the sensors are used to constantly control the warm water circulation pumps such that the difference between the liquid levels in the first and second buffer tanks becomes almost constant. Thus, even when the two warm water circulation pumps are not perfectly equal in performance in terms of the discharge rate and imbalanced, the trouble that the amount of warm water remaining in one buffer tank keeps increasing while the amount of warm water remaining in the other buffer tank keeps decreasing is unlikely to occur, and the power generation system can be operated stably.

The discharge valve is provided in a lower part of each buffer tank, and the discharge valve is controlled such that, when the measured values of the level meters provided inside the buffer tanks reach a set value, the discharge valves are opened to automatically discharge the warm water inside the buffer tanks so as not to cause overflow of the warm water inside the buffer tanks. Moreover, if the warm water cannot be discharged sufficiently by the discharge valves, the warm water inside the buffer tanks is discharged through the overflow nozzle provided in an upper part of the side surface of each buffer tank. Thus, double countermeasures against overflow are provided.

Since the binary power generation method of converting the thermal energy of the exhaust gas from the cremation furnace into the thermal energy of warm water by passing the exhaust gas through the heat exchanger, vaporizing a low-boiling medium by passing this warm water through the evaporator, and driving the medium turbine with the generated steam to generate power is employed, it is unlikely that the exhaust gas from the cremation furnace, which contains a large amount of dust, flows directly into the evaporator. Therefore, the heat quantity of the exhaust gas from the cremation furnace, which contains a large amount of dust, can be recovered efficiently as electric energy.

DESCRIPTION OF EMBODIMENTS

Next, embodiments of the present invention will be described in detail with reference to FIG. 1 to FIG. 4.

First Embodiment

Figure 1:
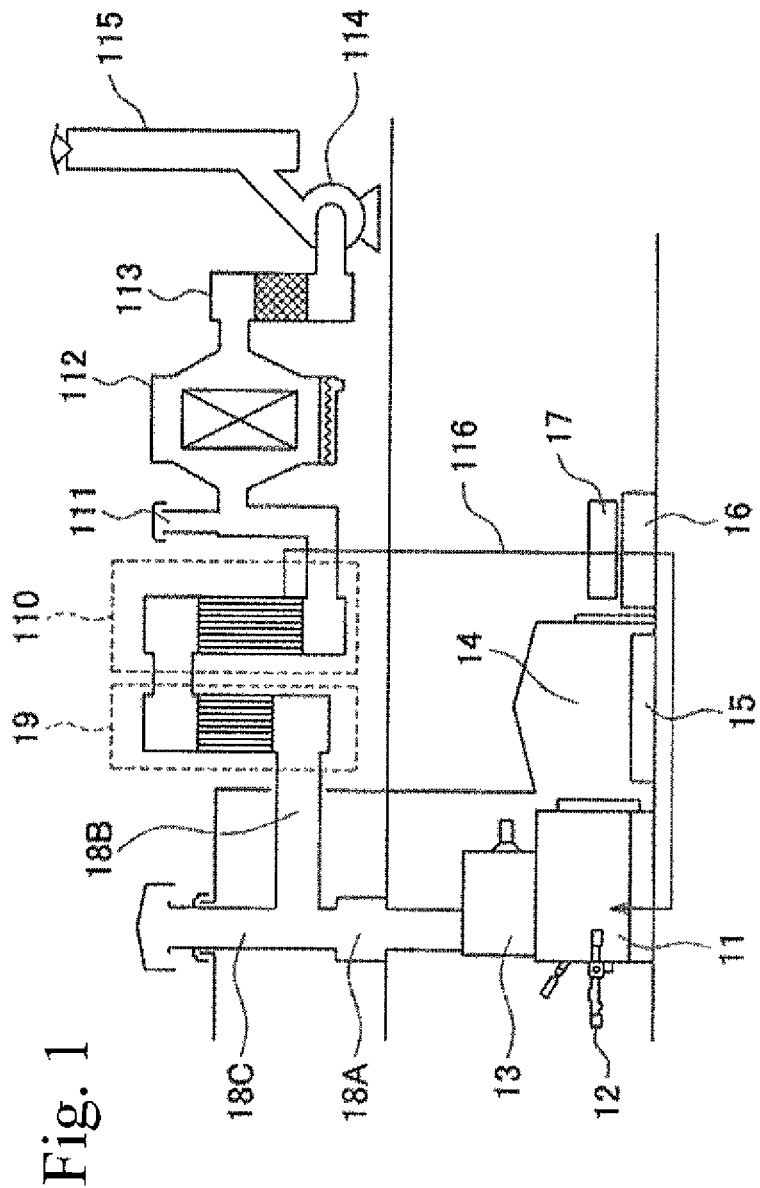
FIG. 1 is a configurational view showing a cremation system according to a first embodiment of the present invention.
Figure 2:
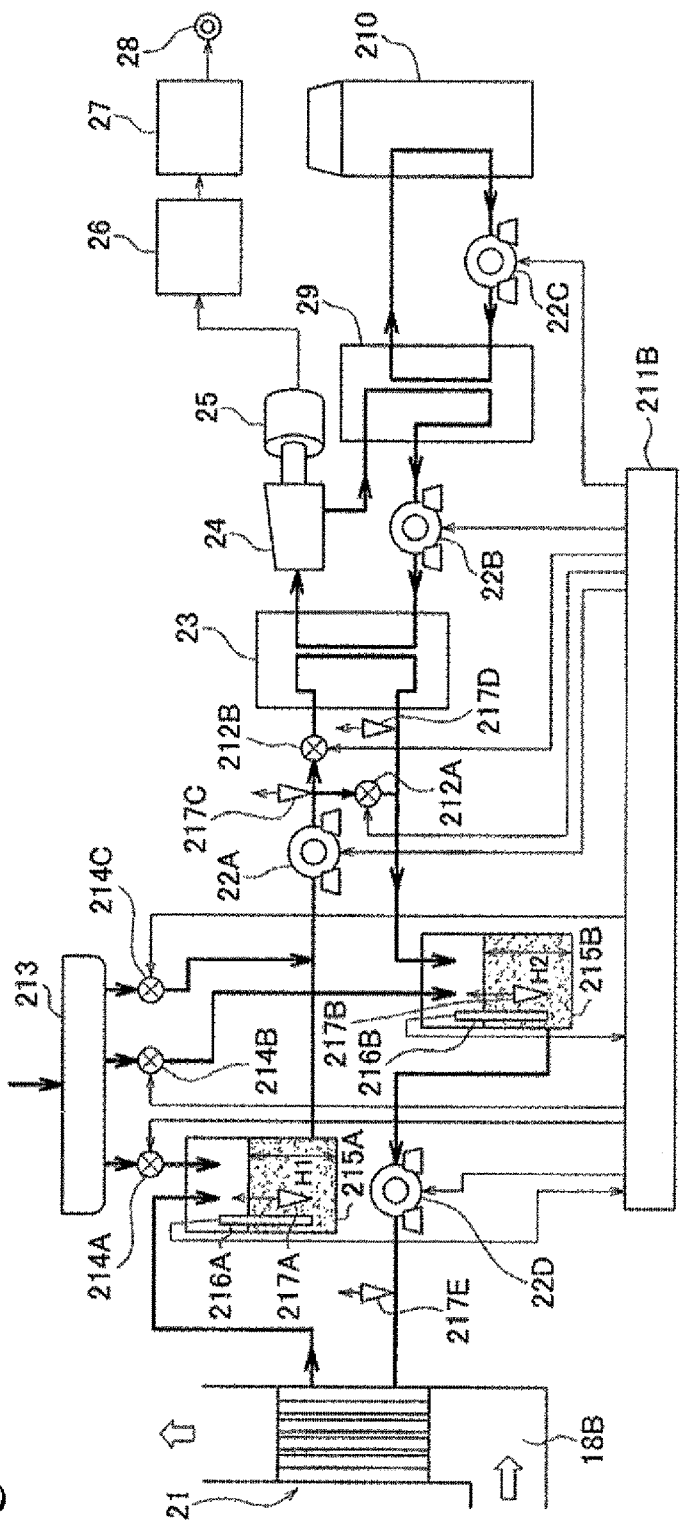
FIG. 2 is a configurational view showing a binary power generation system constituting the cremation system according to the first embodiment of the present invention.
Figure 3:
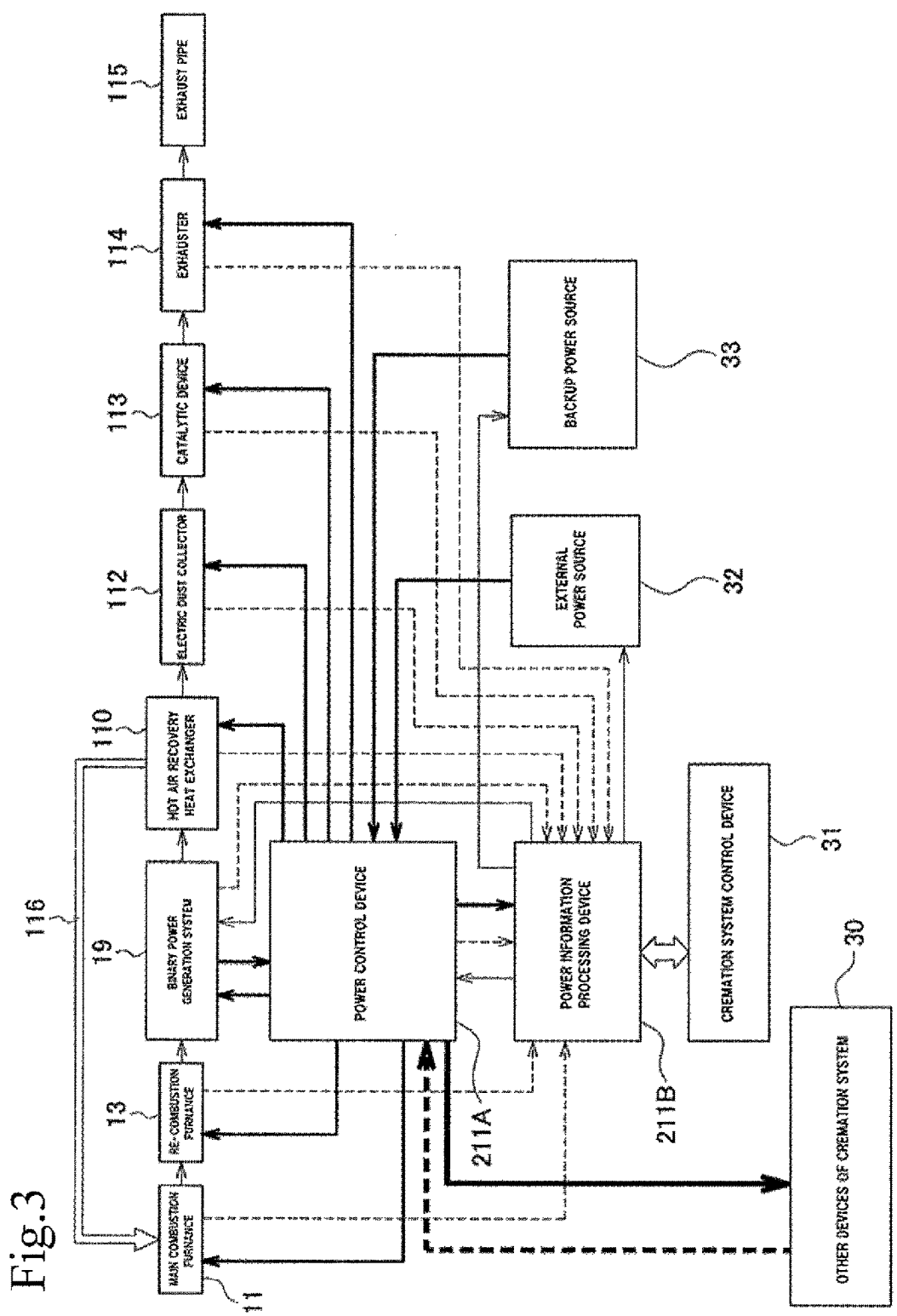
FIG. 3 is a block diagram illustrating the power control action of the cremation system according to the present invention.
Figure 4:
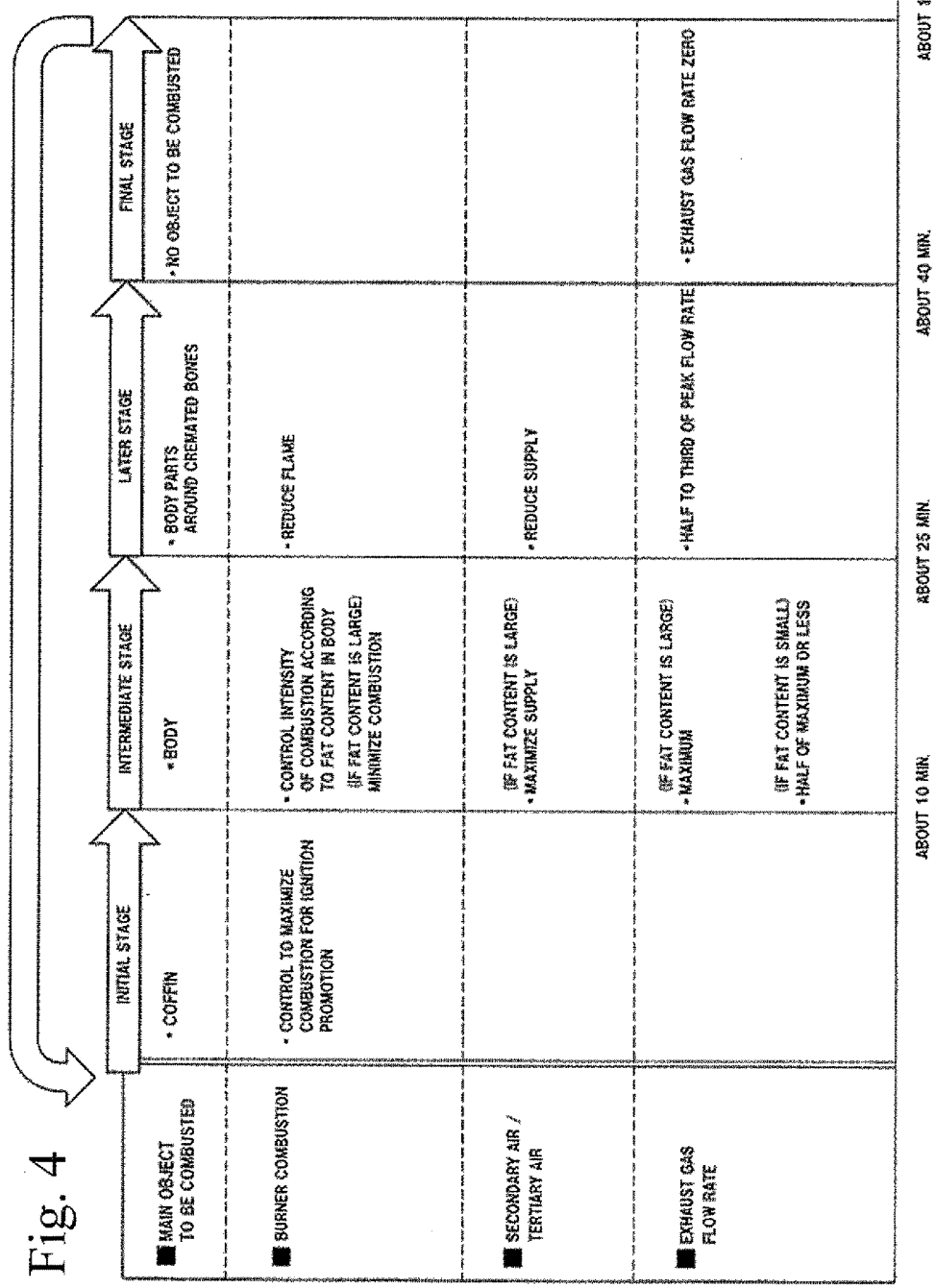
FIG. 4 is a view illustrating a method of combustion in a main combustion furnace.

FIG. 1 is a configurational view of a cremation system according to a first embodiment of the present invention; FIG. 2 is a configurational view of a binary power generation system 19 constituting the cremation system; FIG. 3 is a block diagram illustrating the power control action of the cremation system according to the present invention; and FIG. 4 is a view illustrating a method of combustion in a main combustion furnace 11. The cremation system according to the present invention includes: a farewell stand 16 on which a coffin 17 is placed; the main combustion furnace 11 which combusts a body, burial accessories, a coffin, etc. using a main combustion burner 12; a re-combustion furnace 13 which completely combusts the exhaust gas from the main combustion furnace 11; and an automatic coffin placing device 15 which allows the coffin 17 to be automatically placed in the main combustion furnace 12.

The exhaust gas from the main combustion furnace 11 passes through a common flue 18A, which communicates with the re-combustion furnace 13, and an exhaust duct 18B and is led to the binary power generation system 19. An exhaust gas auxiliary cooling device and emergency exhaust duct 18C is provided, in order to cool the exhaust gas from the common flue 18A and in case of abnormal combustion etc. occurring in the cremation system. The exhaust gas led to an exhaust gas/warm water heat exchanger 21 shown in FIG. 2, which constitutes the binary power generation system 19, exchanges heat with a coolant (water) flowing on the outside of a pipe inside the exhaust gas/warm water heat exchanger 21 to transfer the thermal energy to the coolant, and further flows into a hot air recovery heat exchanger 110. The exhaust gas flowing into the hot air recovery heat exchanger 110 exchanges heat with air, and the hot air heated by the exhaust gas is led to the main combustion furnace 11 through a hot air recovery passage 116. Thus, the combustion efficiency of the main combustion furnace 11 can be enhanced, and fuel saving as well as reduction of combustion time can be achieved. The exhaust gas is discharged from the exhaust gas/warm water heat exchanger 21 in the direction of the upward arrow of FIG. 2, and the exhaust gas flows into the hot air recovery heat exchanger 110 of FIG. 1. The coolant is not limited to water, but can be any medium that exchanges heat with exhaust gas.

The exhaust gas flowing out of the hot air recovery heat exchanger 110 flows along with the outside air, which is taken in from an intake port 111 in order to lower the exhaust gas temperature, into an electric dust collector 112, where dust contained in the exhaust gas is removed. Next, the exhaust gas flowing out of the electric dust collector 112 is sent to a catalytic device 113, where dioxin and the like, such as nitrogen oxide, odorous components, polychlorinated dibenzodioxin, and polychlorinated dibenzofuran, contained in the exhaust gas are removed. The discharged gas flowing out of the catalytic device 113 is suctioned by an exhauster 114 and discharged to the atmosphere through an exhaust pipe 115.

Thus, the cremation system according to the present invention removes harmful substances such as a large amount of dust and dioxin and the like generated in the main combustion furnace 11 to regenerate the exhaust gas as clean air and returns it to the atmosphere. At the same time, the cremation system uses the high-temperature thermal energy possessed by the exhaust gas to generate power by means of the binary power generation system, and supplies the generated power to the devices constituting the cremation system. Thus, a part or the whole of the power required by the devices can be covered, and the energy saving performance of the cremation system as a whole can be significantly improved.

That the temperature and the flow rate of the exhaust gas and the amount of the exhaust heat from the cremation furnace change widely during cremation, as described above, is the most important point in establishing a next-generation cremation system aiming at further energy saving. Next, the method of combustion in the cremation furnace will be described specifically with reference to FIG. 4.

The cremation method is roughly divided into four stages, proceeding in the order of an initial stage, an intermediate stage, a later stage, and a final stage, and it takes about an hour from the start of cremation to collection of cremated bones. This cycle is repeated one to seven times a day in each furnace. In the initial stage (from the start of combustion to about 10th minute), the flame of the main combustion burner 12 is maximized to promote ignition, while a larger amount of secondary air and tertiary air is supplied from the side wall of the main combustion furnace 11 to combust mainly the coffin. By this combustion method, the coffin is combusted rapidly compared with the body. Accordingly, the exhaust gas temperature rises rapidly and a large amount of exhaust gas is temporarily generated.

Next, in the intermediate stage, the object to be combusted shifts from the coffin to the body and the burial accessories, and the manner of combustion and the flow rate of the exhaust gas change widely depending on the fat content of the body. In the case of a body with a large fat content, which combusts intensely, the size of the flame of the main combustion burner 12 is minimized while the supply of secondary air and tertiary air from the side wall of the main combustion furnace 11 is maximized to keep the self-sustaining combustion under control. By this combustion method, a body with a larger fat content results in a high flow rate of the exhaust gas, while a body with a smaller fat content combusts less intensely than a body with a larger fat content, and experience shows that the exhaust gas flow rate is about less than half that when a body with a larger fat content is combusted.

Next, in the later stage, body parts remaining around the cremated bones are combusted. Since too intense a flame of the main combustion burner 12 pulverizes the cremated bones and makes them difficult to collect, the intensity of the flame as well as the supply of secondary air and tertiary air from the side wall of the main combustion furnace 11 are controlled to be reduced. By this combustion method, the exhaust gas flow rate is reduced to about a half to a third of that at the peak.

Next, in the final stage, the main combustion furnace 11 is air-cooled, and cremated bones on a bone tray (not shown) are withdrawn to a front chamber 14 and then to the farewell stand 16, to be collected. Meanwhile, the exhaust gas flow rate has reduced to the zero level. The actual cremation system is typically configured with two to four cremation furnaces integrally as one system, with the above-described four stages sequentially repeated in each cremation furnace. That is, the cremation system is provided with two to four independent main combustion furnaces 11, re-combustion furnaces 13, common flues 18A, exhaust ducts 18B, and exhaust gas auxiliary cooling device and emergency exhaust ducts 18C, and is configured such that the exhaust gas discharged from the two to four exhaust ducts 18B all flows to the binary power generation system 19 equipped with the common exhaust gas/warm water heat exchanger.

Although the cremation start time varies among the cremation furnaces and the cremation stages (from the initial stage to the final stage) are different among the cremation furnaces, in the cremation furnaces of one system, cremation is conducted in parallel. Therefore, if the cremation start times of the cremation furnaces coincide with one another, the heat quantity of the exhaust gas flowing into the binary power generation system 19 fluctuates several times as widely as when there is only one cremation furnace. It is possible to suppress fluctuations in heat quantity of the exhaust gas flowing into the binary power generation system 19 by intentionally staggering the cremation start time. In practice, however, it is difficult to intentionally stagger the cremation start time. Therefore, in the cremation system of the present invention, it may be recognized which stage of the cremation stages (from the initial stage to the final stage) each cremation furnace is at, and a power information processing device 211B may use this information to control such that the binary power generation system 19 generates power stably and efficiently.

In the above description, the cremation is divided into four stages to simplify the description, but, in practice, the cremation controlled is further divided into a larger number of stages. The cremation system may be further provided with thermometers for measuring the temperatures, pressure gauges for measuring the pressures, oxygen content meters for measuring the oxygen concentrations, and smoke content meters for measuring the smoke concentrations, of the main combustion furnace 11 and the re-combustion furnace 13, and the power information processing device 211B may use the information from these sensors to control such that the binary power generation system 19 generates power stably and efficiently.

Next, the binary power generation system 19 will be described in detail with reference to FIG. 2. The exhaust gas from the exhaust duct 18B exchanges heat with a coolant (water) in the exhaust gas/warm water heat exchanger 21 and turns the coolant into warm water. The warm water generated in the exhaust gas/warm water heat exchanger 21 is injected from above a buffer tank 215A into the buffer tank 215A, and is further suctioned from below the buffer tank 215A by a warm water circulation pump 22A and is sent (discharged) to the evaporator 23 through a flow rate regulating valve 212B.

The warm water flowing out of the evaporator 23 is injected from above a buffer tank 215B into the buffer tank 215B, and is further suctioned from below the buffer tank 215B by a warm water circulation pump 22D and is sent (discharged) to the exhaust gas/warm water heat exchanger 21. Thus, the warm water circulates by way of the exhaust gas/warm water heat exchanger 21 to the buffer tank 215A to the warm water circulation pump 22A to the flow rate regulating valve 212B to the evaporator 23 to the buffer tank 215B to the warm water circulation pump 22D to the exhaust gas/warm water heat exchanger 21.

In the evaporator 23, heat is exchanged between a low-boiling working medium, such as ammonia, hydrocarbon, or isobutane, and the warm water, and the working medium is heated and the working medium is vaporized. The working medium steam generated in the evaporator 23 is sent to the medium turbine 24 to drive the medium turbine 24. As the driving shaft of the medium turbine 24 rotates, the driving shaft of the power generator coupled to the driving shaft of the medium turbine 24 also rotates, and the power generator 25 generates power. While FIG. 2 shows the case where the medium turbine 24 and the power generator 25 are independent devices, the medium turbine 24 and the power generator 25 may be integrated on a single shaft. Such configuration allows downsizing of the binary power generation system.

The alternating-current power generated in the power generator 25 is converted into direct-current power in a high-frequency rectifier 26, and the direct-current power is converted into commercial power of 50 Hz, 60 Hz, etc. in a DC/AC converter before being output to a power output terminal 28. The power generator 25 may be provided with an inverter on the output side, and the power generator 25 may be braked by this inverter so as to maximize the power generation efficiency while controlling the number of revolutions of the power generator 25.

Meanwhile, the working medium steam from the medium turbine 24 flows into the condenser 29, where heat is exchanged between the working medium steam and the cooling water and the working medium steam is condensed into a liquid. The cooling water circulates between the condenser 29 and the cooling tower 210 by means of the cooling water circulation pump 22C. The cooling water having increased in temperature in the condenser 29 is cooled in the cooling tower 210 and returns to the condenser 29. Repeating this cycle, the cooling water stably continues heat exchange with the working medium steam in the condenser 29. During this process, the cooling water circulation pump 22C controls the flow rate of the cooling water upon receiving the control signal from the power information processing device 211B. That is, the power information processing device 211B controls, through the signals from a temperature sensor and a pressure sensor provided in the condenser 29, such that power generation is stabilized and the efficiency is maximized.

The working medium flowing out of the condenser 29 is suctioned by the working medium pump 22B and sent to the evaporator 23, where the working medium exchanges heat with the warm water again and is vaporized. This cycle is repeated to continuously perform binary power generation. The power information processing device 211B controls the flow rate of the working medium by means of the working medium pump 22B, through the signals from the temperature sensor and the pressure sensor provided in the condenser 29, such that the output power of the power generator 25 is stabilized and the efficiency is maximized.

As the temperature of the warm water sent from the exhaust gas/warm water heat exchanger 21 to the evaporator 23 generally changes with the temperature, the heat quantity, etc. of the exhaust gas sent to the exhaust gas/warm water heat exchanger 21, the temperature of the warm water changes widely with changes in temperature, heat quantity, etc. of the exhaust gas sent to the exhaust gas/warm water heat exchanger 21. For this reason, if the temperature of the warm water flowing into the evaporator 23 exceeds an allowable value, operation of the binary power generation system may become instable, and in the worst case, the working medium steam may reach an extremely high pressure and break the evaporator 23 etc.

As a preventive measure, the cremation system of the present invention is provided with the two systems of the buffer tanks 215A, 215B, and the temperature of the warm water flowing into these buffer tanks 215A, 215B is averaged with the temperature of the warm water inside the buffer tanks 215A, 215B, so as to significantly reduce the fluctuations in temperature of the warm water flowing into these buffer tanks 215A, 215B. To describe this specifically with reference to FIG. 2, the buffer tank 215A is provided between the exhaust gas/warm water heat exchanger 21 and the warm water circulation pump 22A, and the buffer tank 215B is provided between the evaporator 23 and the warm water circulation pump 22D. The buffer tanks 215A, 215B are provided with level meters 216A, 216B, respectively, for measuring the amount of warm water, in other words, the liquid level of the warm water, remaining inside the buffer tanks 215A, 215B, and the buffer tanks 215A, 215B are further provided with thermometers 217A, 217B, respectively, for measuring the temperature of the warm water inside the buffer tanks 215A, 215B. Temperature signals from the thermometers 217A, 217B are output to the power information processing device 211B, although the signal line is not shown in FIG. 2. The signal line for the thermometers 217C, 217D is not shown, either.

The warm water from the exhaust gas/warm water heat exchanger 21 is injected from above the buffer tank 215A, and is supplied to the evaporator 23 from below the buffer tank 215A by the warm water circulation pump 22A. The warm water from the evaporator 23 is injected from above the buffer tank 215B, and is supplied from below the buffer tank 215B by the warm water circulation pump 22D to the exhaust gas/warm water heat exchanger 21. During this process, the power information processing device 211B constantly monitors the amount of warm water, that is, the liquid level of the warm water, remaining inside the buffer tanks 215A, 215B through the measurement signals from the level meters 216A, 216B, and dynamically controls the variation from the average flow velocity by means of the warm water circulation pumps 22A, 22D such that the amount of remaining warm water becomes equal between the buffer tanks 215A, 215B. That is, when the liquid levels of the warm water inside the buffer tanks 215A, 215B are H1, H2, respectively, the warm water circulation pumps 22A, 22D are used to dynamically control the flow rate per unit time, that is, the flow velocity, of the warm water so as to satisfy the relation H1=H2.

Specifically, when the relation is H1>H2, the number of revolutions of the warm water circulation pump 22A is increased to increase the amount of outflow from the buffer tank 215A, while the number of revolutions of the warm water circulation pump 22B is reduced to reduce the amount of outflow from the buffer tank 215B. When the relation is H1<H2, the control is performed in the reverse manner. When the warm water circulation pumps 22A, 22B are not perfectly equal in performance but imbalanced, this manner of control can prevent the trouble that, due to the different pump discharge rates of the warm water circulation pumps 22A, 22B, the amount of warm water remaining in one buffer tank keeps increasing and eventually the warm water overflows from the buffer tank, while the amount of warm water remaining in the other buffer tank keeps decreasing and the buffer tank becomes empty with no warm water remaining in it. In the above description, the warm water circulation pumps are controlled such that the relation H1=H2 is satisfied, but it is not absolutely necessary to thus limit the control; the same effect can be obtained by controlling the pumps such that the formula $\Delta H = |H1-H2|$ gives a constant value.

The discharge valve (not shown) is provided in a lower part of each of the buffer tanks 215A, 215B, and the discharge valves are automatically controlled such that, when the measured values of the level meters 216A, 216B provided inside the buffer tanks reach a set value, the discharge valves are opened to discharge the warm water inside the buffer tanks 216A, 216B in order to prevent overflow of the warm water inside the buffer tanks 216A, 216B. If the warm water cannot be discharged sufficiently by the discharge valves, the warm water inside the buffer tanks 216A, 216B is discharged through the overflow nozzle (not shown) provided in an upper part of the side surface of each of the buffer tanks 216A, 216B. Thus, double overflow countermeasures are provided.

Next, the control of the warm water temperature will be described. The power information processing device 211B controls the water injection valve 214A and the water injection valve 214B with reference to the thermometers 217A, 217B such that, when the temperatures measured by these thermometers 217A, 217B rise and reach a set value, the water injection valve 214A or the water injection valve 214B is opened to inject the cooling water from the water injection device 213 to the buffer tank 215A or/and the buffer tank 215B so that the temperature of the warm water inside the buffer tank 215A and the buffer tank 215B becomes equal to or lower than the set value. The power information processing device 211B further controls the water injection valve 214C with reference to the thermometer 217C, which measures the temperature of the warm water flowing into the evaporator 23, such that, when the temperature measured by this thermometer 217C rises and reaches a set value, the water injection valve 214C is opened to inject the cooling water to the warm water, which flows from the buffer tank 215A through a pipe into the warm water circulation pump 22A, so that the temperature of the warm water flowing into the evaporator 23 becomes equal to or lower than the set value. This mechanism allows stable operation of the cremation system as a whole even in the event of failure, because, if the warm water heated to a high temperature due to some failure flows into the evaporator 23, the cooling water is directly injected to the pipe connected with the warm water circulation pump 22A to lower the warm water temperature at once. In the above description, the cooling water is injected from the water injection device 213 to the buffer tank 215A or/and the buffer tank 215B, and the pipe connected with the warm water circulation pump 22A; however, the medium is not limited to cooling water but may be any medium that cools a high-temperature medium, for example, a medium which exchanges heat with exhaust gas in the exhaust gas/warm water heat exchanger 21.

Next, another method for stabilizing the warm water temperature in the binary power generation system 19 of the present invention will be described. A bypass passage is provided between the buffer tank 215A and the evaporator 23, and the power information processing device 211B controls the flow velocity of the warm water flowing into the evaporator 23 by means of the flow rate regulating valve 212A and the flow rate regulating valve 212B such that the temperature or the heat quantity of the warm water from the buffer tank 215A does not exceed a set value. Specifically, the power information processing device 211B controls the flow rate regulating valves 212A, 212B, with reference to a thermometer 217D which measures the temperature $T_{out}$ of the warm water flowing out of the evaporator 23, such that this temperature $T_{out}$ is constantly at a set temperature $T_{out}$ (set value). That is, the power information processing device 211B controls the flow rate regulating valves 212A, 212B, such that, when the temperature $T_{out}$ exceeds the temperature $T_{out}$ (set value), the opening of the flow rate regulating valve 212B is reduced to suppress the flow rate of the warm water flowing into the evaporator 23, and conversely, the flow rate regulating valve 212A is opened to increase the flow rate of the warm water directly returning to the exhaust gas/warm water heat exchanger 21. In the reverse case where the temperature $T_{out}$ falls below the temperature $T_{out}$ (set value), the power information processing device 211B controls the flow rate regulating valves 212A, 212B such that the flow rate regulating valve 212B is opened to increase the flow rate of the warm water flowing into the evaporator 23, and conversely, the opening of the flow rate regulating valve 212A is reduced to suppress the flow rate of the warm water directly returning to the exhaust gas/warm water heat exchanger 21. Despite the problem of severe fluctuations of warm water which is peculiar to the cremation system, this manner of control can significantly suppress the temperature fluctuations of the warm water flowing into the evaporator 23, so that the binary power generation can be operated stably.

When the temperature of the warm water from the exhaust gas/warm water heat exchanger 21 falls, power generation stops in a typical binary power generation system, but in the cremation system of the present invention, the power information processing device 211B controls the flow rate regulating valve 212A and the flow rate regulating valve 212B so as to increase the flow rate of the warm water flowing into the evaporator 23 and suppress the flow rate of the warm water returning to the exhaust gas/warm water heat exchanger 21 through the flow rate regulating valve 212B. Thus, it is possible to control the temperature of the warm water flowing into the evaporator 23 so as not to fall even when the temperature of the warm water from the buffer tank 215A falls. In other words, since the temperature or the heat quantity of the warm water flowing into the evaporator 23 is controlled to be constant even when the temperature and the heat quantity of the exhaust gas change significantly, the cremation system according to the present invention can generate power stably, and the cremation system as a whole can be operated always stably by stably supplying the generated power to the devices constituting the cremation system.

In the above description, the power information processing device 211B controls the water injection valves 214A, 214B, 214C using the temperature information from the thermometers 217A, 217B, 217C; however, as described with FIG. 4, since the temperature and the heat quantity of the exhaust gas from the cremation furnace can be roughly estimated from the time that has elapsed from the cremation start time, the power information processing device 211B may use this information to calculate the control data in advance and control the water injection valves 214A, 214B, 214C accordingly.

Next, the supply of mainly power generated in the binary power generation system 19 to the devices constituting the cremation system, and the power control of the cremation system of the present invention performed using the various pieces of information input from the devices to the power information processing device 211B will be described with reference to FIG. 3.

In FIG. 3, the thick lines indicate a power flow, the thin lines indicate control signals, and the broken lines indicate detection signals from various sensors mounted in the devices. The reference sign 116 denotes a hot air recovery passage for sending the hot air, which is generated in the hot air recovery heat exchanger 110, to the main combustion furnace 11. While FIG. 3 shows the power control device 211A and the power information processing device 211B as devices present on the outside of the binary power generation system 19, the power control device 211A and the power information processing device 211B may be configured as a part of the binary power generation system 19, and the power control device 211A and the power information processing device 211B may be configured as a part of the cremation system control device 31. Moreover, the power control device 211A and the power information processing device 211B may be configured integrally. That is, the power control device 211A, the power information processing device 211B, and the cremation system control device 31 can be flexibly combined according to the configuration of hardware, software and firmware. The power information processing device 211B and the cremation system control device 31 perform mainly software control, but may partially perform hardware control as well.

The configuration, in which the power control device 211A controlling mainly power and the power information processing device 211B processing mainly analog signals or digital signals are divided, has been described with FIG. 3. The reason is as follows. The power control device 211A processes a large amount of power and radiates noise to the surroundings. If this noise enters an analog circuit or a circuit vulnerable to noise inside the power information processing device 211B, such a circuit malfunctions, which may lead to malfunction or instability of the control of the power information processing device 211B. In view of this, measures such as separating the power lines of the power control device 211A and the power information processing device 211B and shielding the power information processing device 211B are provided, in order to prevent the large amount of noise generated from the power control device 211A from entering the power information processing device 211B and causing malfunction of the power information processing device 211B.

Next, to describe this specifically with reference to FIG. 3, the power generated in the binary power generation system 19 is supplied by the power control device 211A to the devices constituting the cremation system, specifically, the main combustion furnace 11, the re-combustion furnace 13, the electric devices including the warm water circulation pump 22A constituting the binary power generation system 19, the hot air recovery heat exchanger 110, the electric dust collector 112, the catalytic device 113, the exhauster 114, electronic devices such as the CPU and the memory constituting the power information processing device 211B, and other devices 30 of the cremation system, specifically, the main combustion burner 12 and the automatic coffin placing device 15 shown in FIG. 1.

On the other hand, signals from various sensors mounted in the main combustion furnace 11, the re-combustion furnace 13, the binary power generation system 19, the hot air recovery heat exchanger 110, the electric dust collector 112, etc., specifically, flow meters, various thermometers, pressure gauges, oxygen content meters, and smoke content meters are input to the power information processing device 211B, and the power information processing device 211B uses these pieces of information for calculation, and outputs a control signal generated on the basis of the calculation result to the power control device 211A.

As described above, the temperature and the heat quantity of the exhaust gas discharged from the main combustion furnace 11 and the re-combustion furnace 13 fluctuate widely, and the binary power generation system 19 of the present invention controls so as to suppress power fluctuations due to such fluctuations as far as possible, but some degree of fluctuations is unavoidable. Therefore, the power required in the devices is calculated, and in addition to the power generated in the binary power generation system 19, power from the external power source 32 is supplied, for any shortfall in power, to the devices so that the power supply to the devices is stabilized.

Since the power generated in the binary power generation system 19 and the power required by the devices can be calculated in advance based on the operation state of the cremation furnace, the power information processing device 211B may use the calculated power information for controlling such that the cremation system as a whole and the devices constituting the cremation system do not run short of power.

The backup power source 33 serves to back up the external power source 32 in case the external power source 32 becomes temporarily unavailable in accidents, natural disasters, etc. That is, when the power supply from the external power source 32 stops, the backup power source 33 is started immediately through the control signal from the power information processing device 211B or the signal from the external power source 32, and the power supply to the power control device 211A is switched from the external power source 32 to the backup power source 33. One characteristic of the cremation system is that cremation is required to be conducted stably under any circumstances, and while the backup power source 33 is effective in emergency situations, it is not essential for the cremation system of the present invention.

Figure 5:
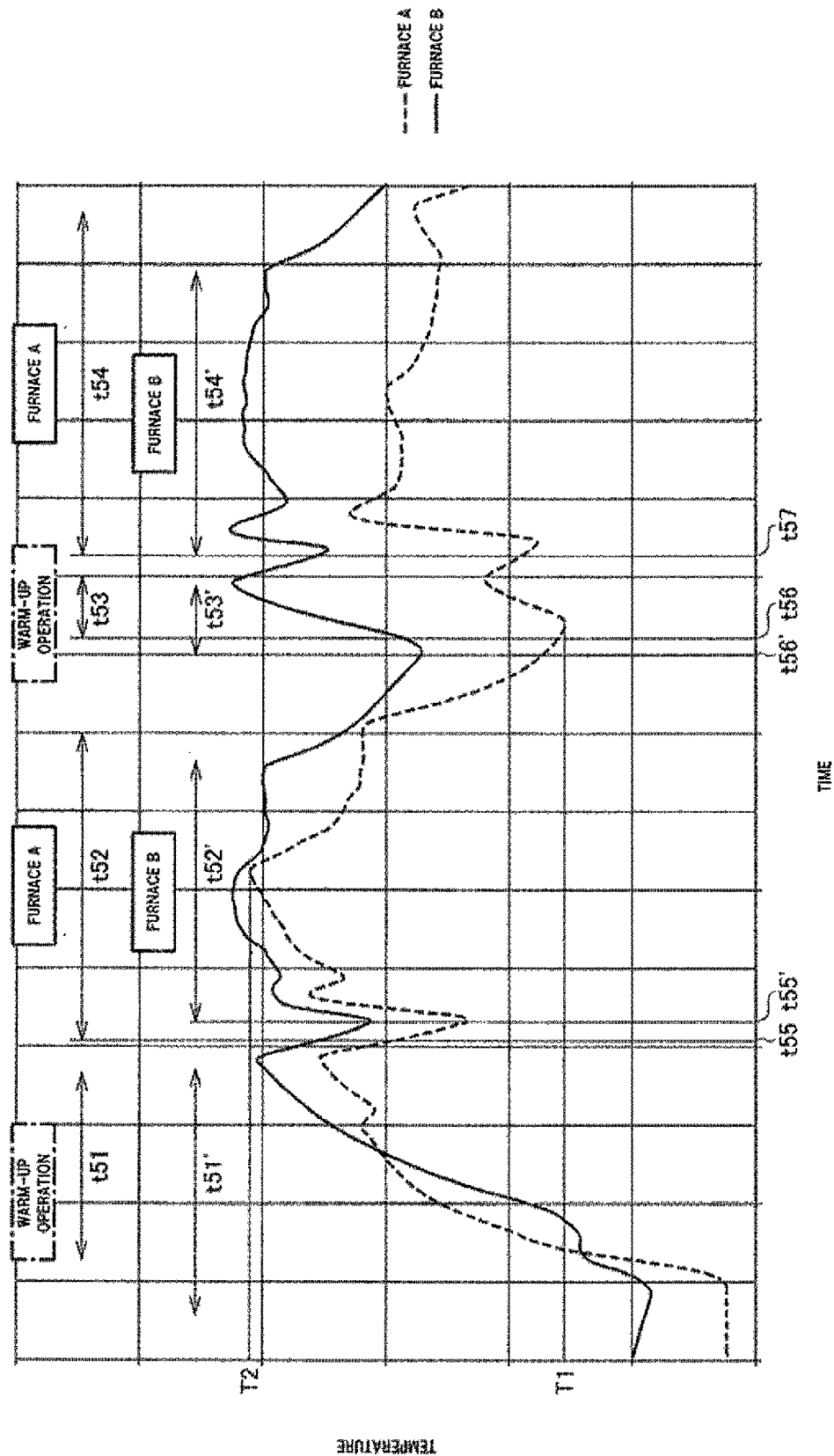
FIG. 5 is a graph showing changes with time in re-combustion furnace temperature.

Next, experimental data on the cremation system of the present invention will be described with reference to FIG. 5 to FIG. 8. FIG. 5 is a graph showing changes with time in re-combustion furnace temperature in the re-combustion furnace 13 shown in FIG. 1. FIG. 5 shows a case where two cremation furnaces, a furnace A and a furnace B, in parallel operation are operated almost concurrently, with the broken line indicating temperature changes of the furnace A and the solid line showing temperature changes of the furnace B. Here, the exhaust gas from a common flue of the furnace A and the exhaust gas from a common flue of the furnace B are discharged to the common exhaust duct 18B, and flow into the exhaust gas/warm water heat exchanger 21 of the binary power generation system 19.

Prior to the start of cremation operation of the day, both the main combustion burner 12 and the re-combustion burner are activated to perform warm-up operation of the furnace A and the furnace B. In this experiment, the warm-up operations of the furnace A and the furnace B last for times t51, t51', respectively, and as a result of the warm-up operation, the temperatures of the re-combustion furnaces rise to near a set temperature T2 of the re-combustion furnaces.

After the warm-up operation, the temperatures of the re-combustion furnaces 13 fall temporarily as the main combustion burner 12 and the re-combustion burner are deactivated, but thereafter, when the operation of the furnace A is started at time t55 and the operation of the furnace B is started at time t55', the temperatures of the re-combustion furnaces 13 rise again to near the temperature T2. After the furnace A and the furnace B are operated continuously for times t52, t52', respectively, when the two cremation furnaces are shut down, a heat insulating door provided in the front surface of the main combustion furnace 11 is opened, so that the outside air flows into the main combustion furnace 11 and the re-combustion furnace 13, causing a rapid fall in temperature of the re-combustion furnaces 13. Thereafter, warm-up operations for the second round of cremation are started at times t56', t56, and subsequently the above-described work is repeated. For the second warm-up operation, warm-up operation periods t53, t53' are significantly shorter than the first warm-up operation periods t51, t51', since both the main combustion furnace 11 and the re-combustion furnace 13 are already warmed to a certain temperature or higher.

Figure 6:
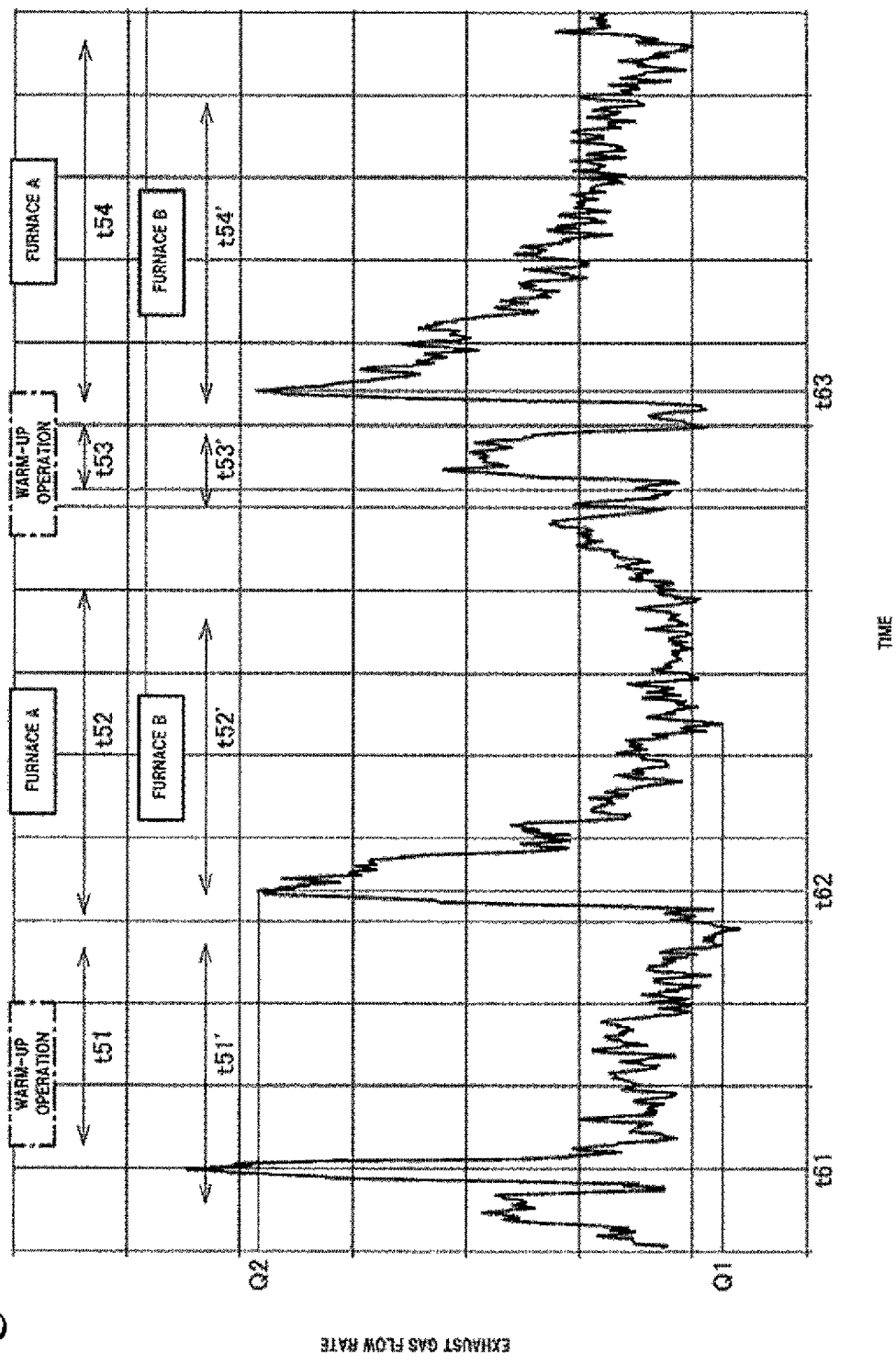
FIG. 6 is a graph showing changes with time in flow rate of exhaust gas from the re-combustion furnace.

Next, changes with time in flow rate of the exhaust gas from the re-combustion furnaces 13 of the furnace A and the furnace B will be described with reference to FIG. 6. The abscissa of FIG. 6 is the same time axis as that of FIG. 5, and the timings of the warm-up operation and the start/stop of the furnace A and the furnace B are also the same as those of FIG. 5, and the same applies to FIG. 7 and FIG. 8. The ordinate of FIG. 6 shows the flow rate of the exhaust gas obtained by adding up the flow rates of the exhaust gas from the re-combustion furnaces 13 of the furnace A and the furnace B. As described above, in the initial stage, a large amount of exhaust gas is temporarily generated, and it can be also seen from the graph that the exhaust gas increases rapidly at times t62, t63 followed by a rapid decrease. The apparent exhaust gas flow rate increases rapidly at time t61, which is because air temporarily flows into the main combustion furnace 11 and the re-combustion furnace 13 when the heat insulating door in the front surface of the main combustion furnace 11 is opened to place the coffin 17 into the main combustion furnace 11.

Next, changes with time in temperature, i.e., temperature $T_{in}$, at the inflow port of the evaporator 23 will be described with reference to FIG. 7. The temperature $T_{in}$ keeps rising as the warm-up operation continues, and further rises rapidly and reaches temperature T72 as the operations of the furnace A and the furnace B are started. That is, as can be seen from FIG. 6, a large amount of exhaust gas heat quantity is generated at the beginning of the cremation, and this heat quantity causes the rapid increase in temperature $T_{in}$ over the time from the cremation start to time t71. Thereafter, as the exhaust gas heat quantity decreases, the temperature $T_{in}$ keeps decreasing and becomes a constant temperature T71 at the same time as the start of warm-up operation, and then rises when the operations of the furnace A and the furnace B are started and repeats the above-described actions.

Even when the exhaust gas temperature and the exhaust gas flow rate change significantly and the exhaust gas heat quantity changes significantly, the cremation system of the present invention is controlled by the above-described mechanism so as to stabilize the temperature of the warm water flowing into the evaporator 23. The following is a rough calculation of how much the rate of fluctuation of the temperature $T_{in}$ is suppressed relative to changes in heat quantity of the exhaust gas.

1) Fluctuation in Exhaust Gas Temperature

From FIG. 5, the exhaust gas temperature fluctuates within the range of the temperatures T1 to T2, hence the rate of fluctuation is T2/((T1+T2)/2)≈44%.

2) Rate of Fluctuation in Exhaust Gas Flow Rate

From FIG. 6, the exhaust gas flow rate fluctuates within the range of the flow rates Q1 to Q2, hence the rate of fluctuation is Q2/((Q1+Q2)/2)≈70%.

3) Rate of Fluctuation in Exhaust Gas Heat Quantity

When the exhaust gas heat quantity is proportional to (exhaust gas temperature)×(exhaust gas flow rate), the rate of fluctuation in exhaust gas heat quantity is 44%+70%=114%.

4) Rate of Fluctuation in Warm Water Temperature without the Control for Stabilizing the Warm Water Temperature When the rate of fluctuation in exhaust gas heat quantity is proportional to the rate of fluctuation in warm water temperature, the rate of fluctuation in warm water temperature without the control for stabilizing the warm water temperature is 114%.

Figure 7:
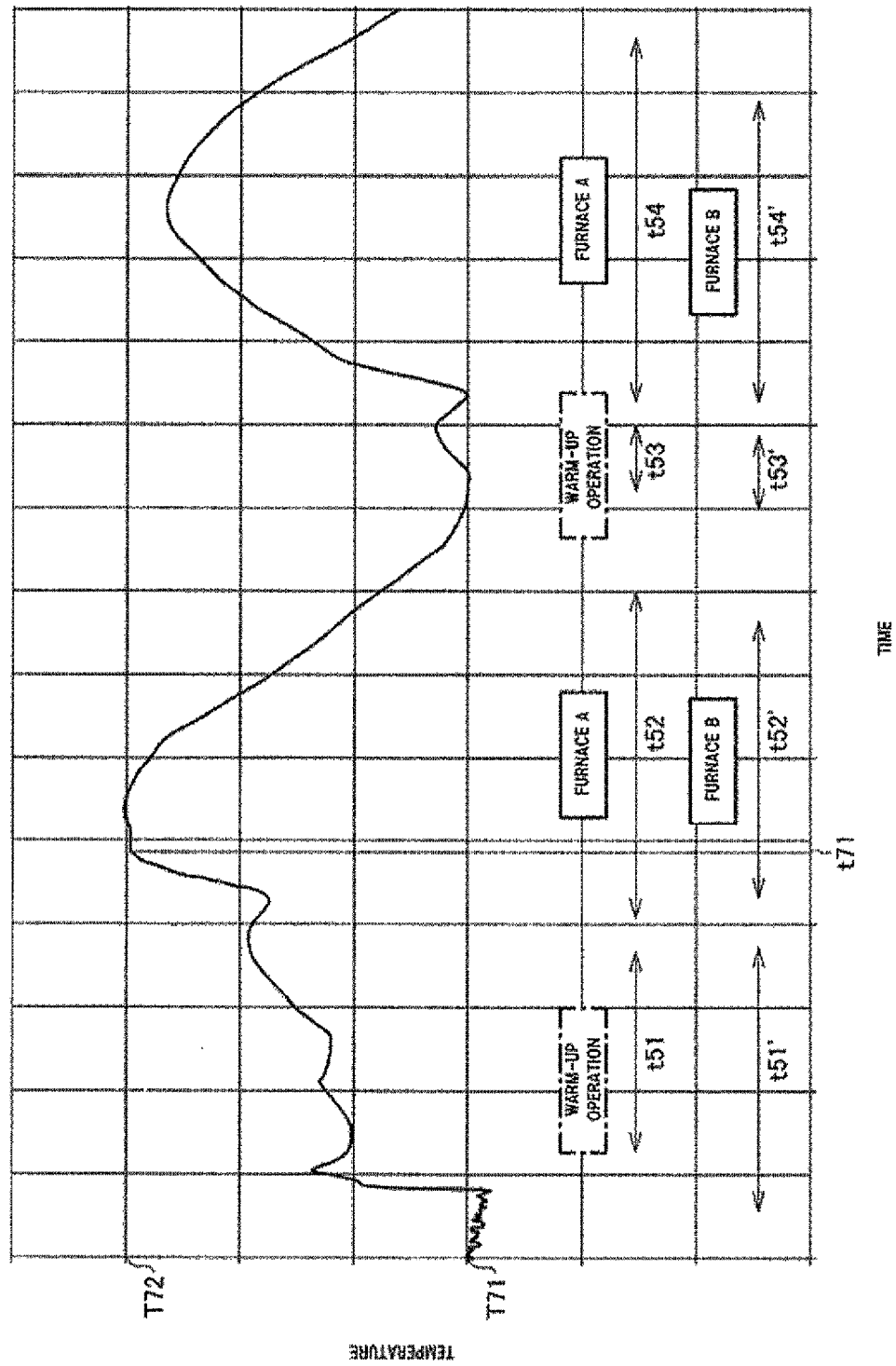
FIG. 7 is a graph showing changes with time in temperature at an inflow port of an evaporator.

On the other hand, from FIG. 7, the rate of fluctuation in temperature $T_{in}$ is T72/((T71+T72)/2)≈9%. This shows that the control for stabilizing the warm water temperature according to the present invention can suppress the fluctuations to approximately 9%/114%≈8% relative to the rate of fluctuation in warm water temperature without the control for stabilizing the warm water temperature.

Figure 8:
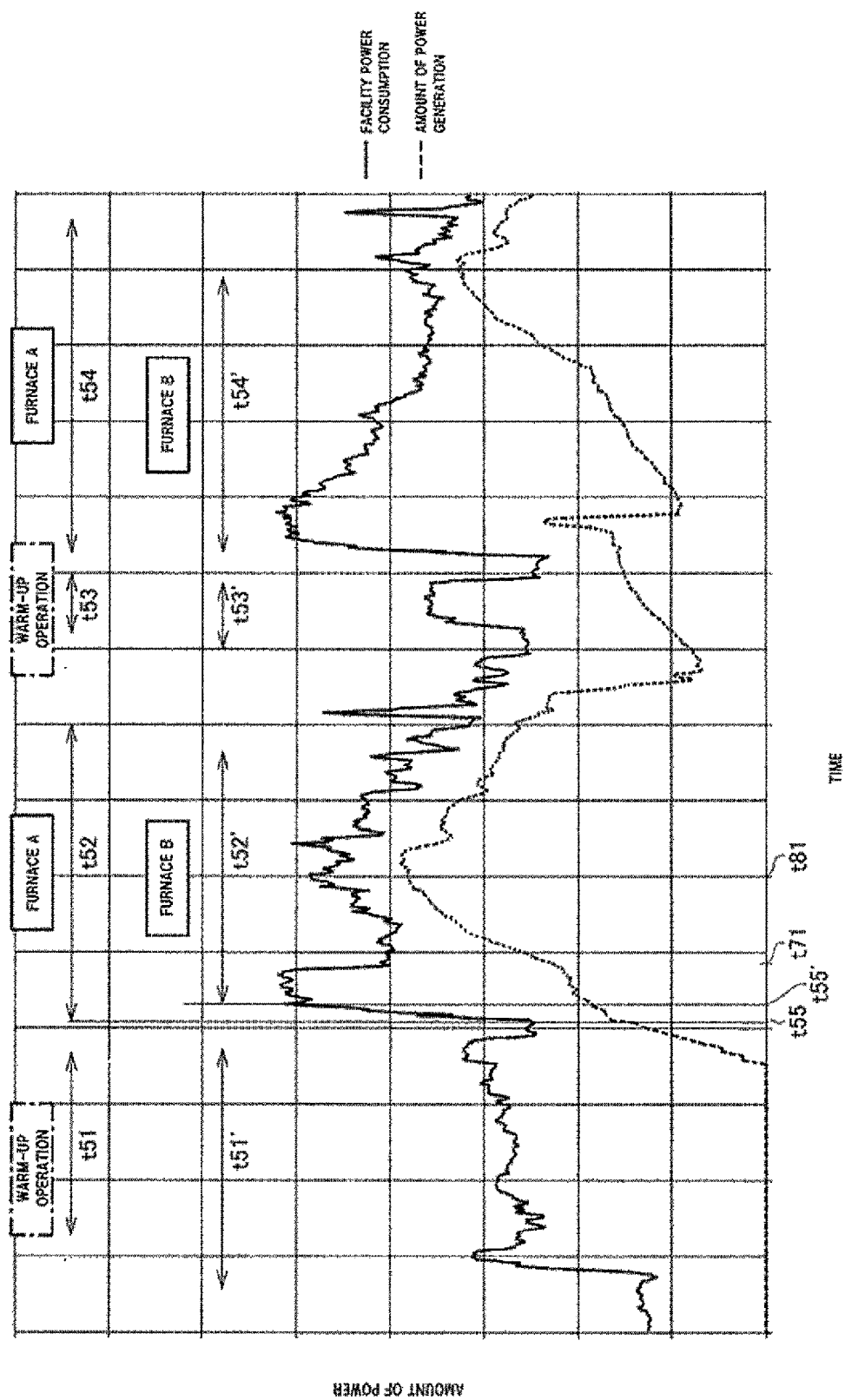
FIG. 8 is a graph showing changes with time in amount of power generation in the cremation system of the present invention and in overall facility power consumption which is the sum of facility power consumption of facilities constituting the cremation system.

Next, changes with time in the amount of power generated in the cremation system of the present invention and in overall facility power consumption, which is the sum of facility power consumption of the facilities constituting the cremation system, will be described with reference to FIG. 8. In FIG. 8, the broken line indicates the amount of power generated in the binary power generation system 19, and the solid line indicates the overall facility power consumption. The amount of power generation starts to increase at the timing between the completion of warm-up operation and the cremation start times t55, t55' of the furnace A and the furnace B, and reaches its peak at around time t81 with a delay of five minutes to 15 minutes from the time at which the temperature $T_{in}$ of FIG. 7 reaches its peak. Thereafter, as can be seen from FIG. 7, as the temperature $T_{in}$ decreases, the amount of power generation also decreases correspondingly, and when the second round of warm-up operation is started, the amount of power generation increases again, and subsequently repeats this cycle.

Meanwhile, the overall facility power consumption rapidly reaches its peak when the cremation is started in the furnace A and the furnace B. This is because, as can be seen from FIG. 6, the exhaust gas flow rate reaches its peak during this period, and the power consumption of the exhauster 114 increases rapidly as it processes the large amount of exhaust gas. Thereafter, the overall facility power consumption increases and decreases according to the activation of each facility, but on average, it decreases gradually toward the end of the cremation.

Next, the ratio between the integrated amount of power generation, which is obtained by time-integrating the amount of power generation, and the integrated amount of overall facility power consumption, which is obtained by time-integrating the overall facility power consumption, namely, the balance of electricity (=integrated amount of power generation/integrated amount of overall facility power consumption), will be described. From FIG. 8, the balance of electricity in the first round of cremation is 53%, the balance of electricity in the second round of cremation is 46%, and the average of the balances of electricity in the first and second rounds is 50%, which shows that the high-efficiency binary power generation system 19 is realized. The balance of electricity in the second round is seemingly lower than the balance of electricity in the first round. This is because, as can be seen from FIG. 7, the temperature $T_{in}$ decreases during the warm-up operation in the second round due to the short duration of the second round of warm-up operation, and does not mean a substantial decrease in balance of electricity during the cremation operation.

Second Embodiment

Next, a second embodiment of the cremation system according to the present invention will be described with reference to FIG. 9. In the above description, the furnace A and the furnace B are concurrently operated. However, more generally, two or more cremation furnaces, independent from one another in terms of operation timing, may be disposed in parallel, and these cremation furnaces may be configured as one set.

Figure 9:
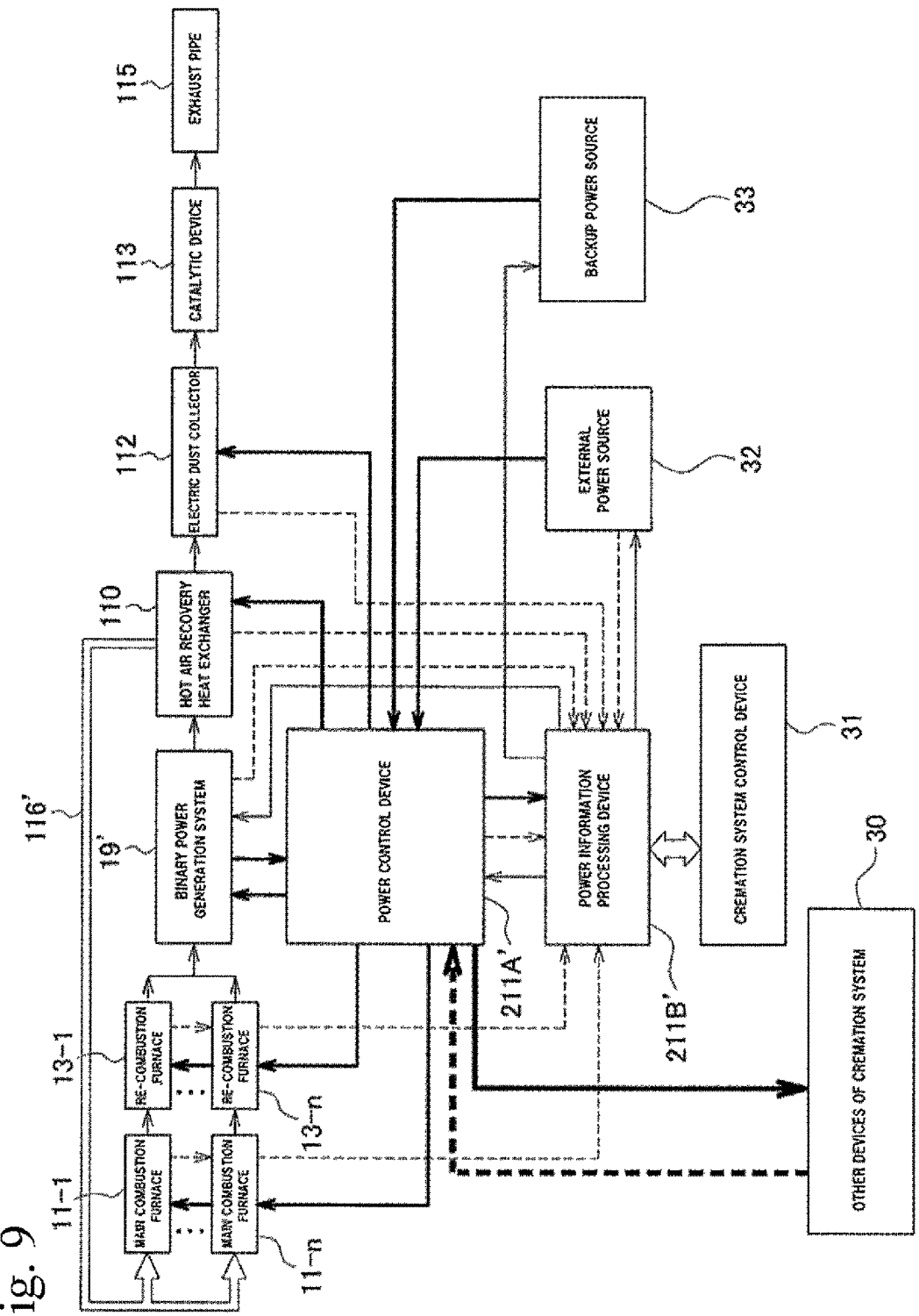
FIG. 9 is a configurational view showing a cremation system according to a second embodiment of the present invention.
Figure 10:
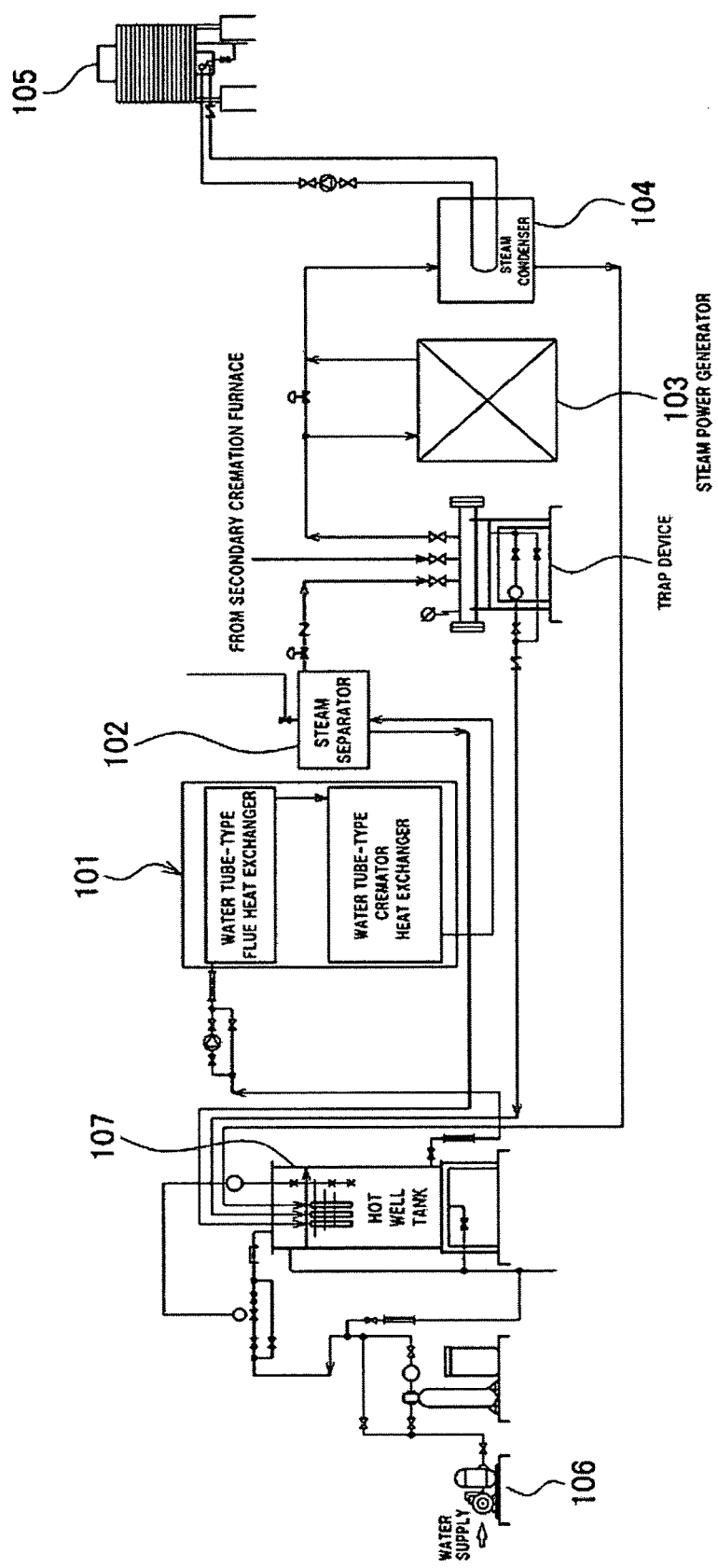
FIG. 10 is a system diagram showing an example of the configuration of a power generation system according to a first conventional technology.
Figure 11:
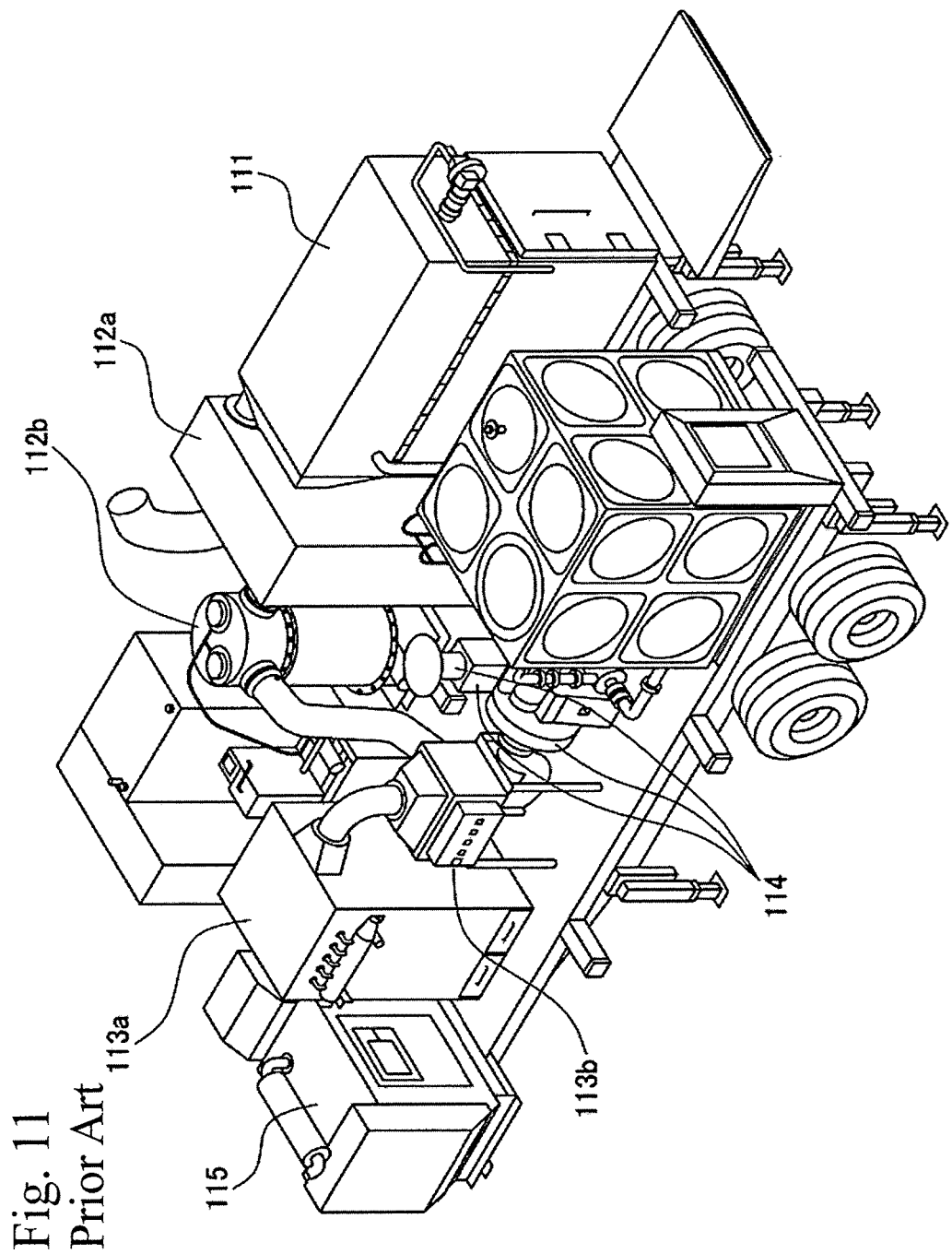
FIG. 11 is a perspective view showing a mobile integral cremation facility according to a second conventional technology.
Figure 12:
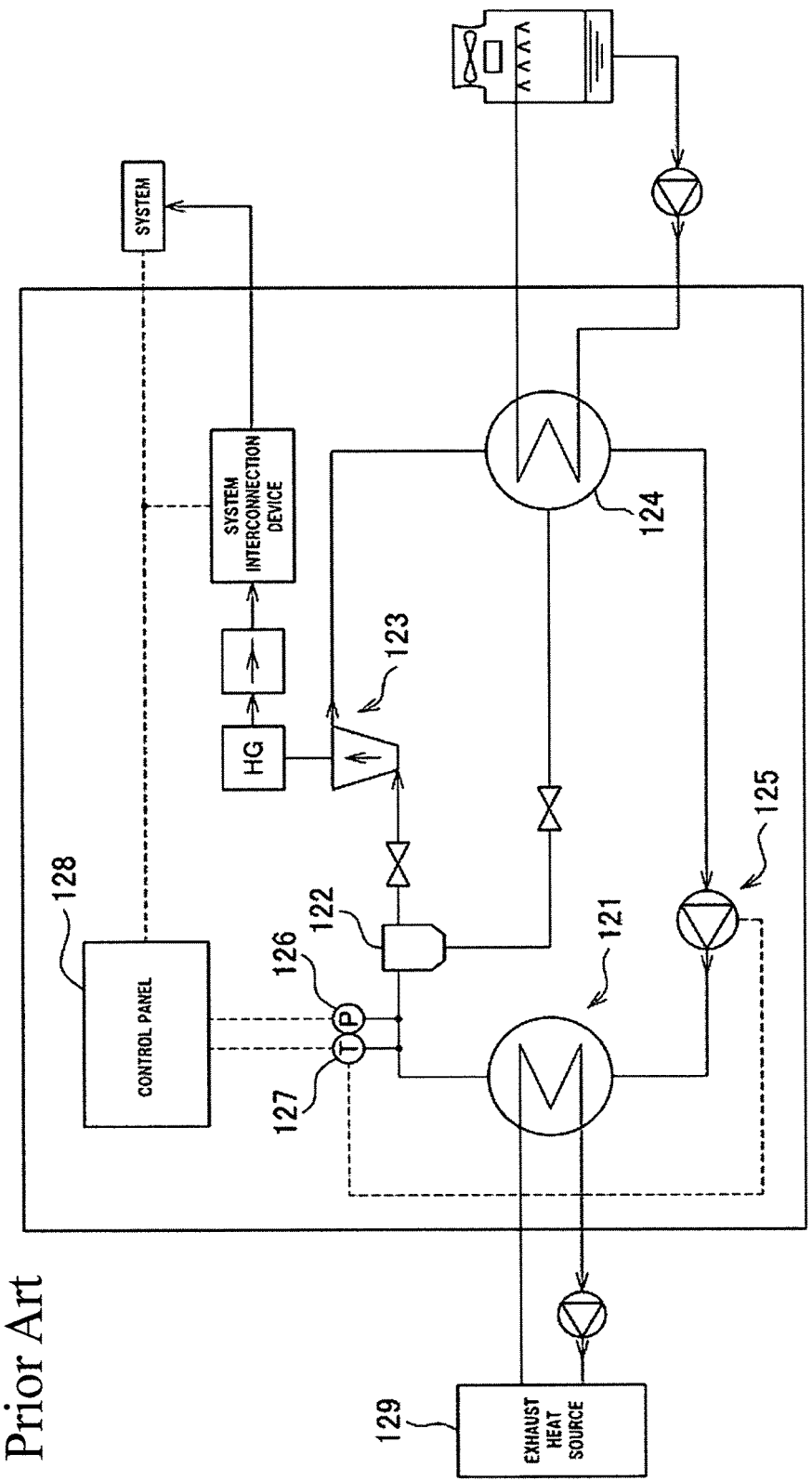
FIG. 12 is a configurational view of an exhaust heat power generation device according to a third conventional technology.
Figure 13:
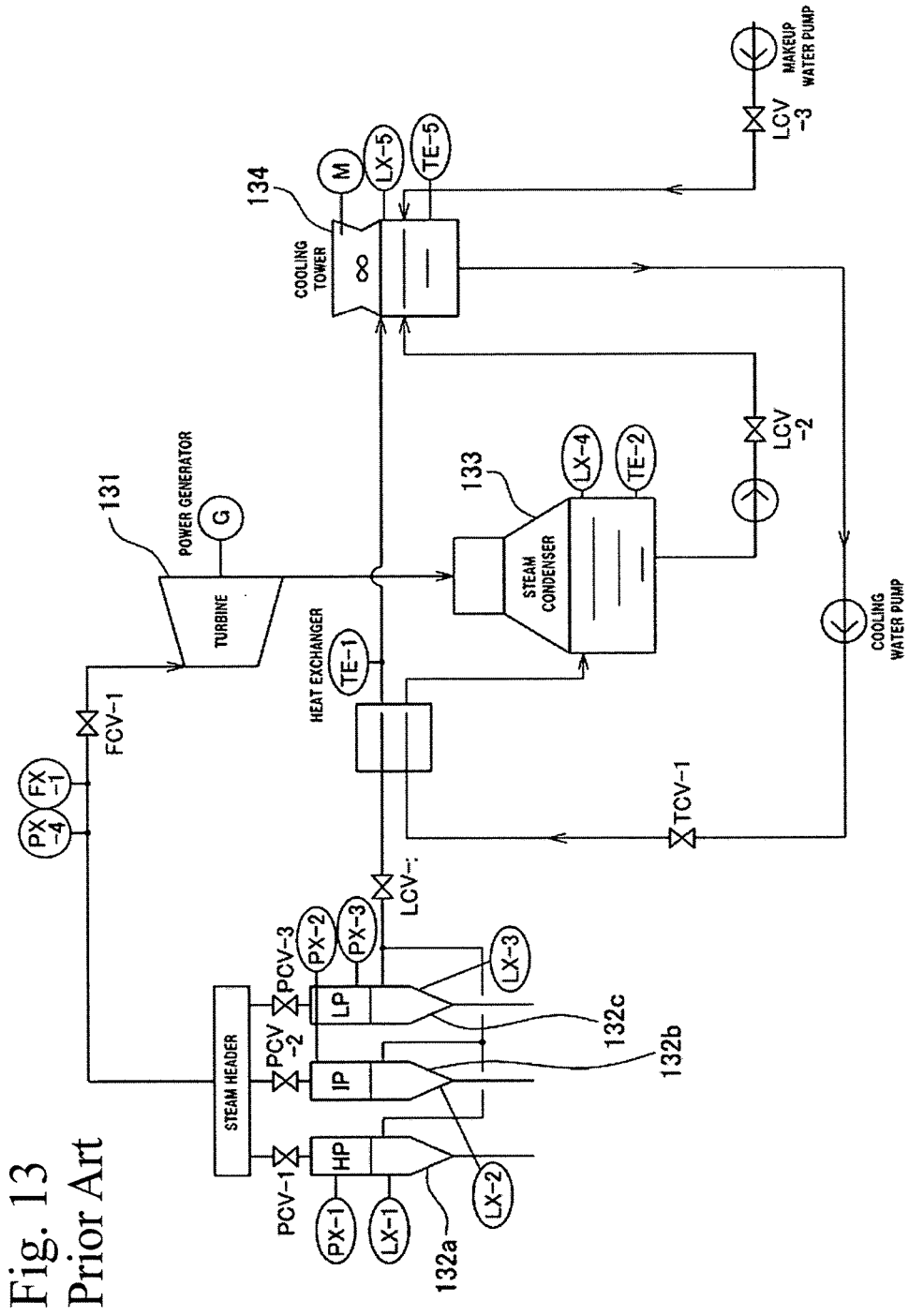
FIG. 13 is a block diagram showing the configuration of a power generation plant utilizing waste heat according to a fourth conventional technology.
Figure 14:
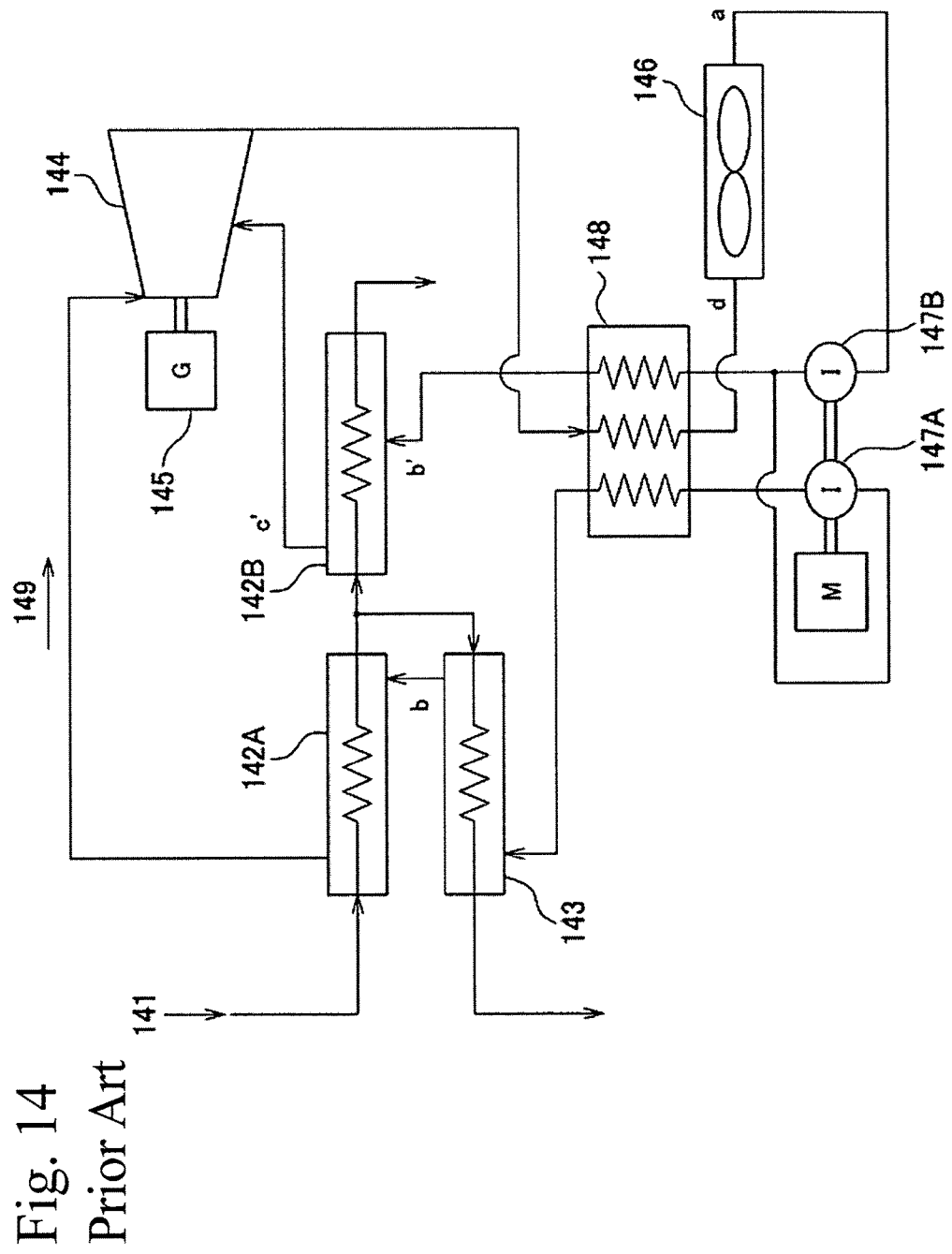
FIG. 14 is a block diagram of a binary power generation system according to a fifth conventional technology.

FIG. 9 is a configurational view of the cremation system according to the second embodiment of the present invention, in which a plurality of main combustion furnaces 11-1 to 11-$n$ and re-combustion furnaces 13-1 to 13-$n$ are provided in parallel, and exhaust gas from the re-combustion furnaces 13-1 to 13-$n$ flows collectively into a binary power generation system 19'. In the cremation system according to this embodiment, it may be recognized which stage of the cremation stages (initial stage to final stage) shown in FIG. 4 each cremation furnace is at, with reference to information from sensors, and a power information processing device 211B' may use this information to control the binary power generation system 19' so as to generate power stably and efficiently.

In the above description, the thermometers 217A, 217B are provided as thermometers for measuring the warm water temperatures in the buffer tanks 215A, 215B, respectively. However, separate thermometers may be provided at the warm water inflow ports and the warm water outflow ports of the buffer tanks 215A, 215B so as to separately measure the temperatures of the warm water at the warm water inflow ports of the buffer tanks 215A, 215B, and the temperatures of the warm water at the warm water outflow ports of the buffer tanks 215A, 215B. This makes it possible to constantly check the effect of equalization of the temperatures in the buffer tanks 215A, 215B on a real-time basis, and to recognize quickly whether or not the temperature control is functioning normally.

REFERENCE SIGNS LIST 11, 11-1 to 11-$n$ Main combustion furnace
12 Main combustion burner
13, 13-1 to 13-$n$ Re-combustion furnace
14 Front chamber
15 Automatic coffin placing device
16 Farewell stand
17 Coffin
18A Common flue
18B Exhaust duct
18C Exhaust gas auxiliary cooling device and emergency exhaust duct
19, 19' Binary power generation system equipped with an exhaust gas/warm water heat exchanger
110 Hot air recovery heat exchanger
111 Suction port
112 Electric dust collector
113 Catalytic device
114 Exhauster
115 Exhaust pipe
116, 116' Hot air recovery passage
21 Exhaust gas/warm water heat exchanger
22A, 22D Warm water circulation pump
22B Working medium pump
22C Cooling water circulation pump
23 Evaporator
24 Medium turbine
25 Power generator
26 High-frequency rectifier
27 DC/AC converter
28 Power output terminal
29 Condenser
210 Cooling tower
211A, 211A' Power control device
211B, 211B' Power information processing device
212A, 212B Flow rate regulating valve
213 Water injection device
214A, 214B, 214C Water injection valve
215A, 215B Buffer tank
216A, 216B Level meter
217A, 217B, 217C, 217D Thermometer
30 Other devices of the cremation system
31 Cremation system control device
32 External power source
33 Backup power source

The invention claimed is:
1. A cremation system comprising:
an incineration furnace for combusting a body;
an exhaust gas/medium heat exchanger into which exhaust gas from the incineration furnace flows and which exchanges the heat of the exhaust gas with the heat of a medium;
a first buffer tank into which the medium is injected and which controls temperature fluctuations of the medium;
an evaporator which generates working medium steam by heating and evaporating a low-boiling working medium with the heat of the medium from the first buffer tank;
a medium turbine which is driven by the working medium steam;
a power generator which is driven by the medium turbine and generates power;
a second buffer tank into which the medium flowing out of the evaporator is injected, and which suppresses temperature fluctuations of the medium and supplies the medium to the exhaust gas/medium heat exchanger;
a power control device which supplies power generated in the power generator to devices constituting the cremation system, while covering any shortfall in power required by the devices with power from an external power source, and
cooling medium injection means, which injects the cooling medium for cooling the medium, in a medium passage which is provided between the first buffer tank and the evaporator and through which the medium flows,
wherein the cooling medium injection means is controlled such that the temperature of the medium flowing into the evaporator is within a set temperature range.

2. The cremation system according to claim 1, wherein, when the temperatures of the medium inside the first buffer tank and the second buffer tank exceed respective set temperatures, a cooling medium for cooling the medium inside the buffer tanks is injected into the first buffer tank and the second buffer tank.

3. The cremation system according to claim 1, further comprising:
a first flow rate regulating valve which is provided between the first buffer tank and the evaporator;
a bypass passage through which the medium is returned from between the first buffer tank and the evaporator to the exhaust gas/medium heat exchanger; and
a second flow rate regulating valve which is provided in the bypass passage, wherein
the first flow rate regulating valve and the second flow rate regulating valve are controlled such that the temperature of the medium flowing out of the evaporator is within a set temperature range.

4. The cremation system according to claim 1, further comprising a power information processing device which calculates information from various sensors provided in the cremation system and generates a control signal, and controls at least one device of the devices constituting the cremation system through the control signal.

5. The cremation system according to claim 1, wherein a plurality of the cremation furnaces is provided in parallel, and exhaust gases from the cremation furnaces flow into a common exhaust gas/medium heat exchanger.

6. The cremation system according to claim 1, further comprising:
a hot air recovery heat exchanger which exchanges the heat of the exhaust gas discharged from the exhaust gas/medium heat exchanger with the heat of air to generate hot air; and
a hot air recovery passage through which the hot air is sent to the cremation furnace.

7. The cremation system according to claim 1, further comprising a backup power source in case of failure of the external power source, wherein, when power from the external power source stops or decreases, the external power source is switched to the backup power source.

8. A cremation system comprising:
an incineration furnace for combusting a body;

an exhaust gas/medium heat exchanger into which exhaust gas from the incineration furnace flows and which exchanges the heat of the exhaust gas with the heat of a medium;

a first buffer tank into which the medium is injected and which controls temperature fluctuations of the medium;

an evaporator which generates working medium steam by heating and evaporating a low-boiling working medium with the heat of the medium from the first buffer tank;

a medium turbine which is driven by the working medium steam;

a power generator which is driven by the medium turbine and generates power;

a second buffer tank into which the medium flowing out of the evaporator is injected, and which suppresses temperature fluctuations of the medium and supplies the medium to the exhaust gas/medium heat exchanger;

a power control device which supplies power generated in the power generator to devices constituting the cremation system, while covering any shortfall in power required by the devices with power from an external power source;

a first flow rate regulating valve which is provided between the first buffer tank and the evaporator;

a bypass passage through which the medium is returned from between the first buffer tank and the evaporator to the exhaust gas/medium heat exchanger;

a second flow rate regulating valve which is provided in the bypass passage;

a first medium circulation pump which suctions the medium flowing out of the first buffer tank and sends the medium to the evaporator;

a second medium circulation pump which suctions the medium flowing out of the second buffer tank and sends the medium to the exhaust gas/medium heat exchanger; and a first level meter and a second level meter which measure a first liquid level and a second liquid level of the medium inside the first buffer tank and the second buffer tank, respectively, wherein the first flow rate regulating valve and the second flow rate regulating valve are controlled such that the temperature of the medium flowing out of the evaporator is within a set temperature range, and the first medium circulation pump and the second medium circulation pump control the flow velocity of the medium such that the difference between the first liquid level and the second liquid level is a constant value.

9. The cremation system according to claim 8, wherein, when it is determined that the first liquid level and the second liquid level reach their respective set values with reference to signals from the first level meter and the second level meter, discharge valves provided in the first buffer tank and the second buffer tank are opened to discharge the medium inside the first buffer tank and the second buffer tank.

10. The cremation system according to claim 8, wherein, with reference to information on a combustion stage of the cremation furnace, at least one of the exhaust gas/medium heat exchanger, the evaporator, the medium turbine, the power generator, the cooling medium injection means, the first flow rate regulating valve, the second flow rate regulating valve, the first medium circulation pump, the second medium circulation pump, and the means for injecting the cooling medium to the first buffer tank and the second buffer tank is controlled.

* * * * *